May 30, 1933.  A. G. RAYBURN  1,912,308
COMPENSATING SPRING SUSPENSION FOR VEHICLES
Filed Feb. 5, 1930  7 Sheets-Sheet 1
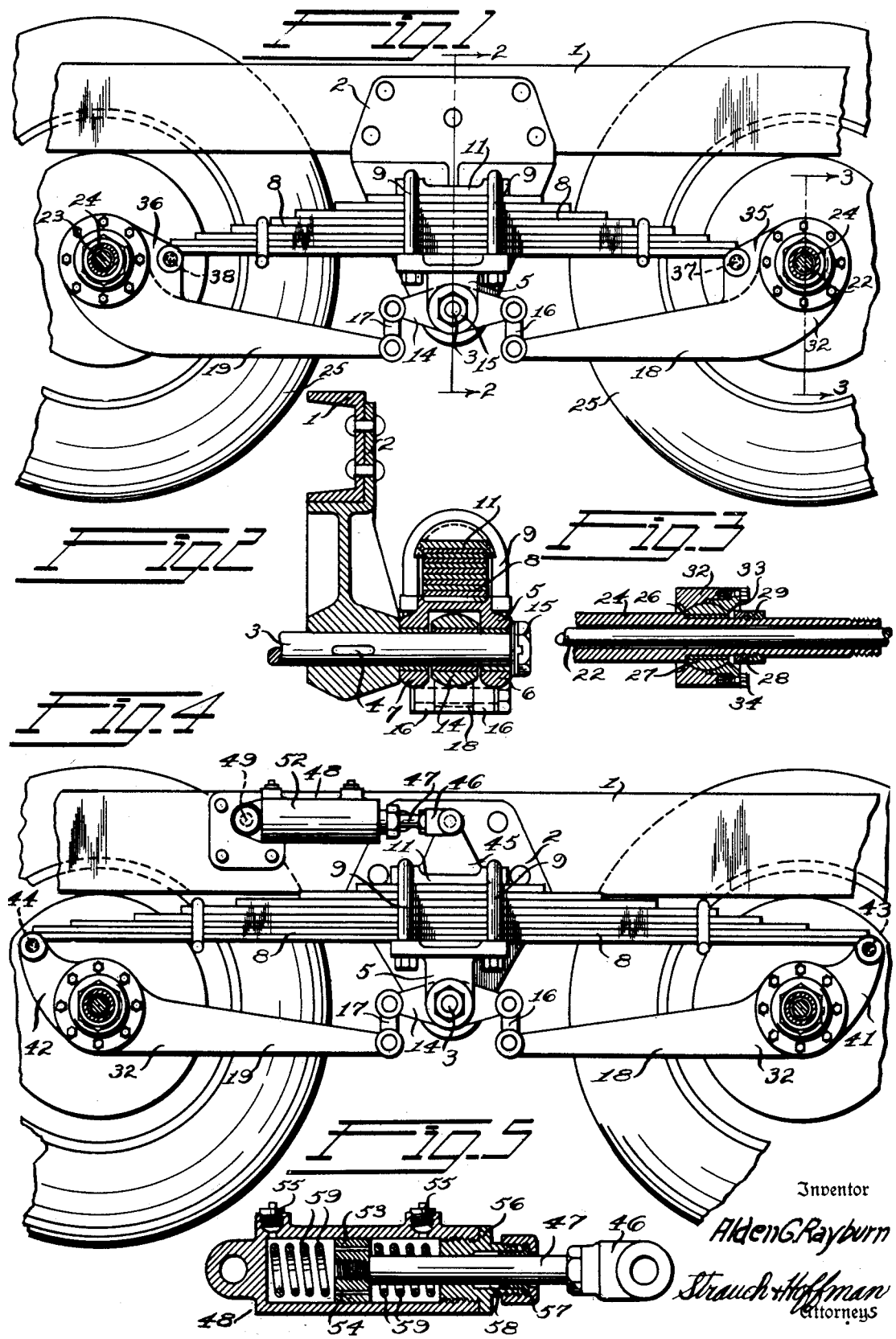
Inventor
Alden G. Rayburn
Strauch & Hoffman
Attorneys

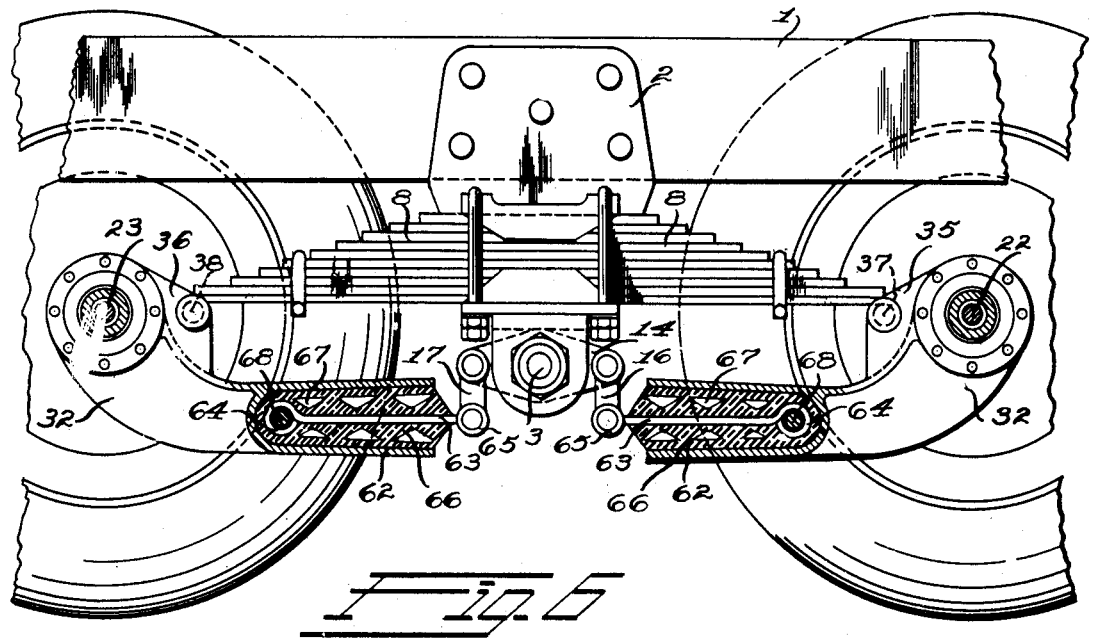
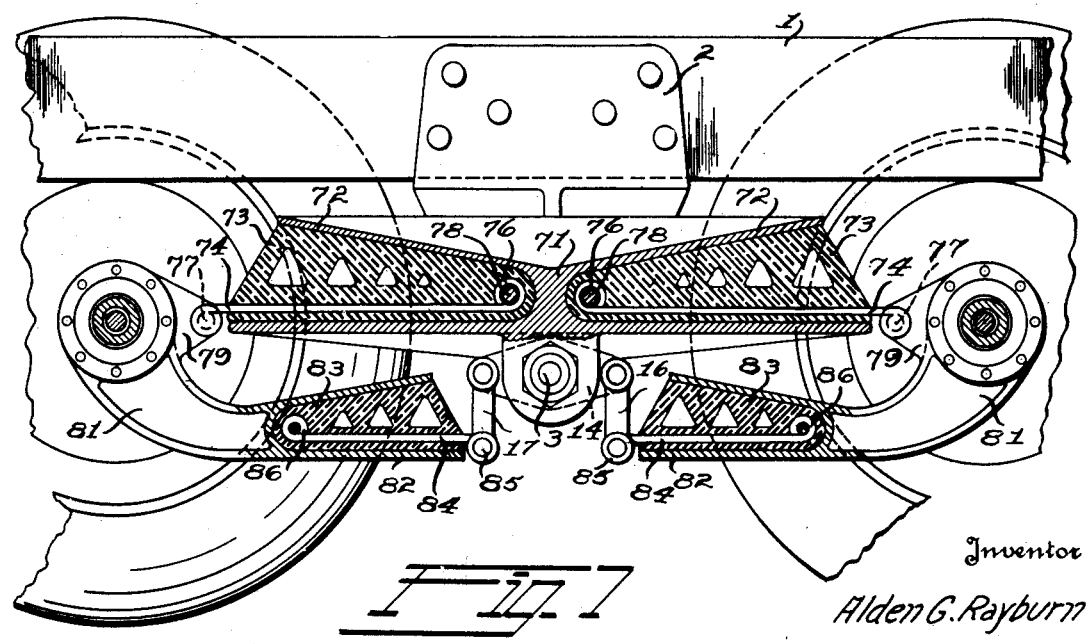

May 30, 1933. A. G. RAYBURN 1,912,308
COMPENSATING SPRING SUSPENSION FOR VEHICLES
Filed Feb. 5, 1930 7 Sheets-Sheet 3
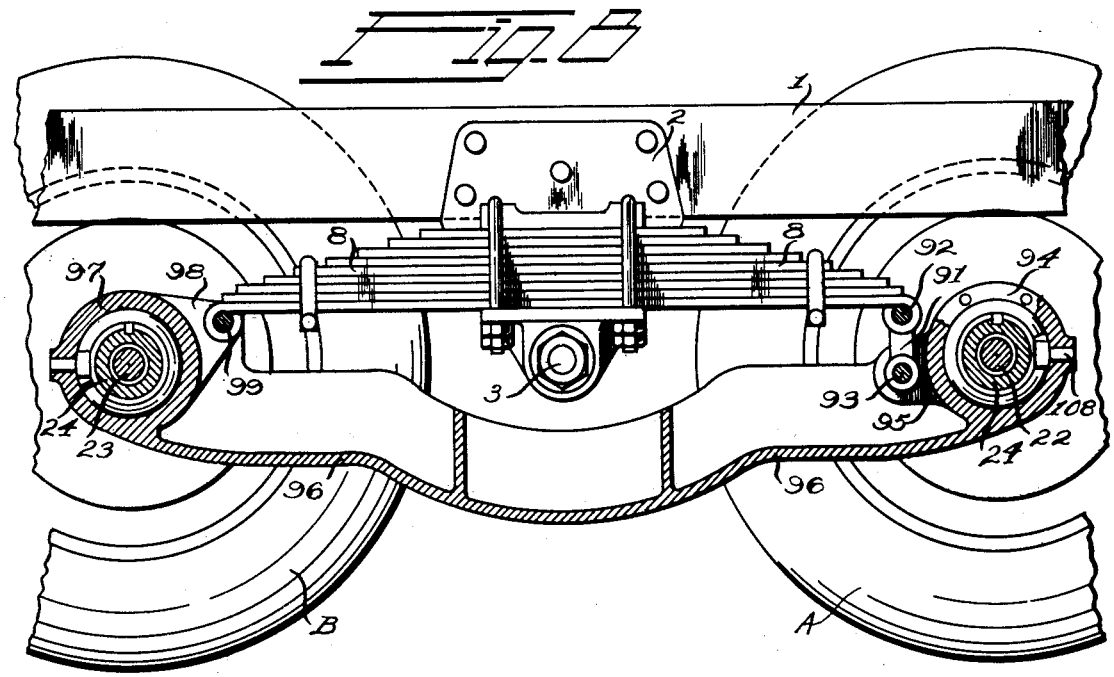
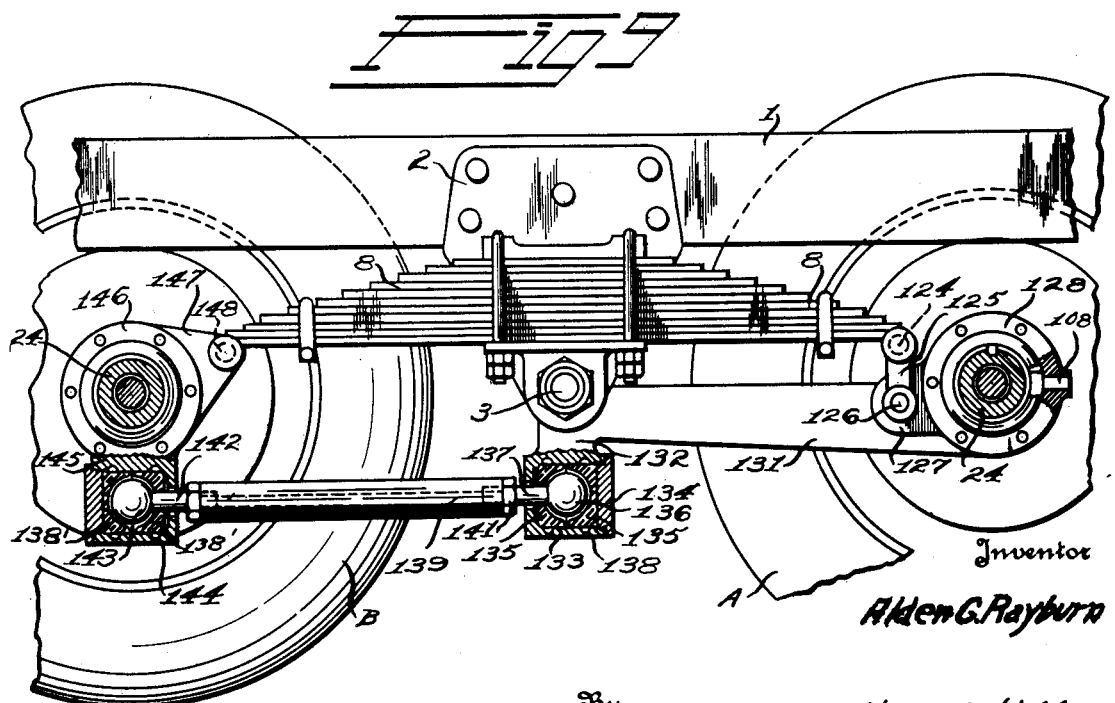
Inventor
Alden G. Rayburn
By Strauch + Hoffman
Attorney May 30, 1933.  A. G. RAYBURN  1,912,308
COMPENSATING SPRING SUSPENSION FOR VEHICLES
Filed Feb. 5, 1930  7 Sheets-Sheet 4
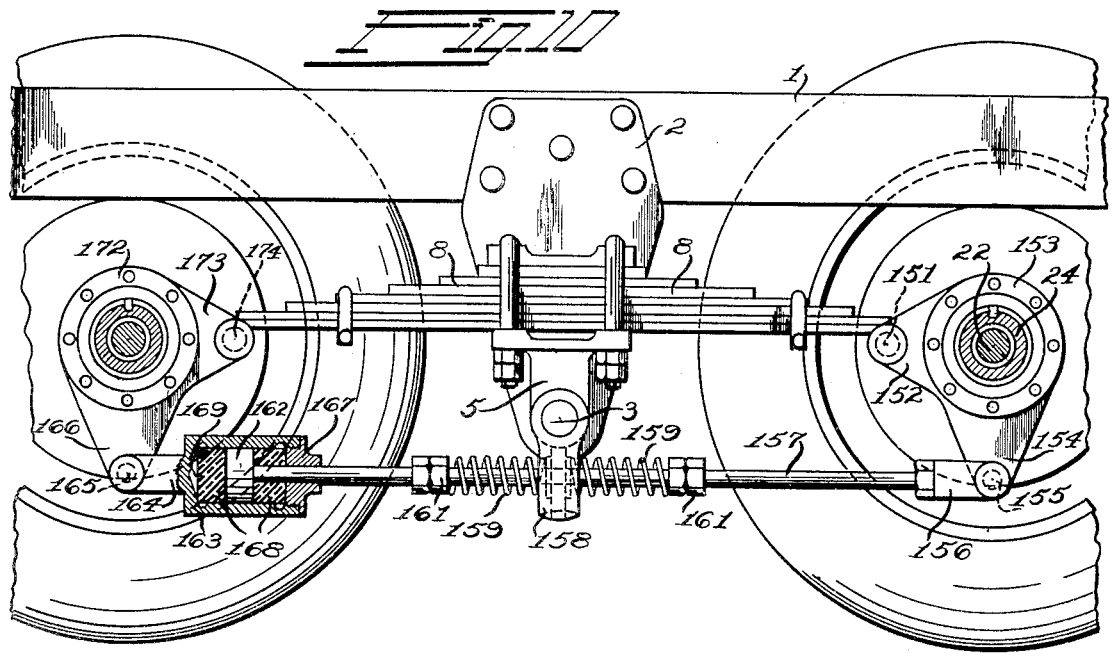
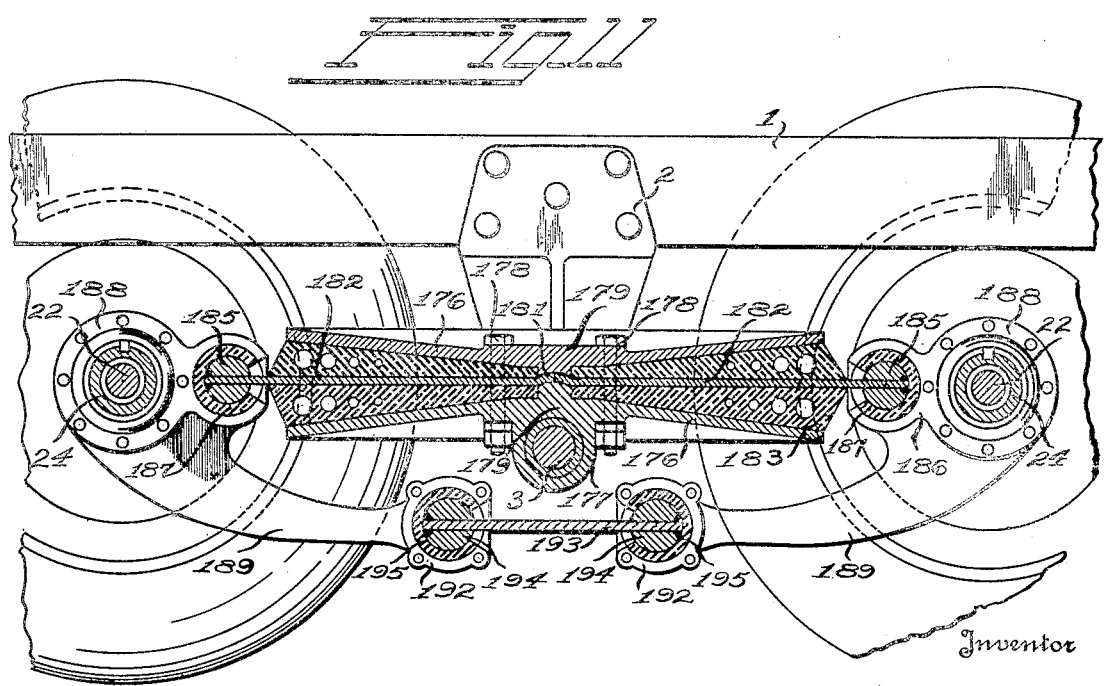
Inventor
Alden G. Rayburn
Strauch & Hoffman
Attorneys

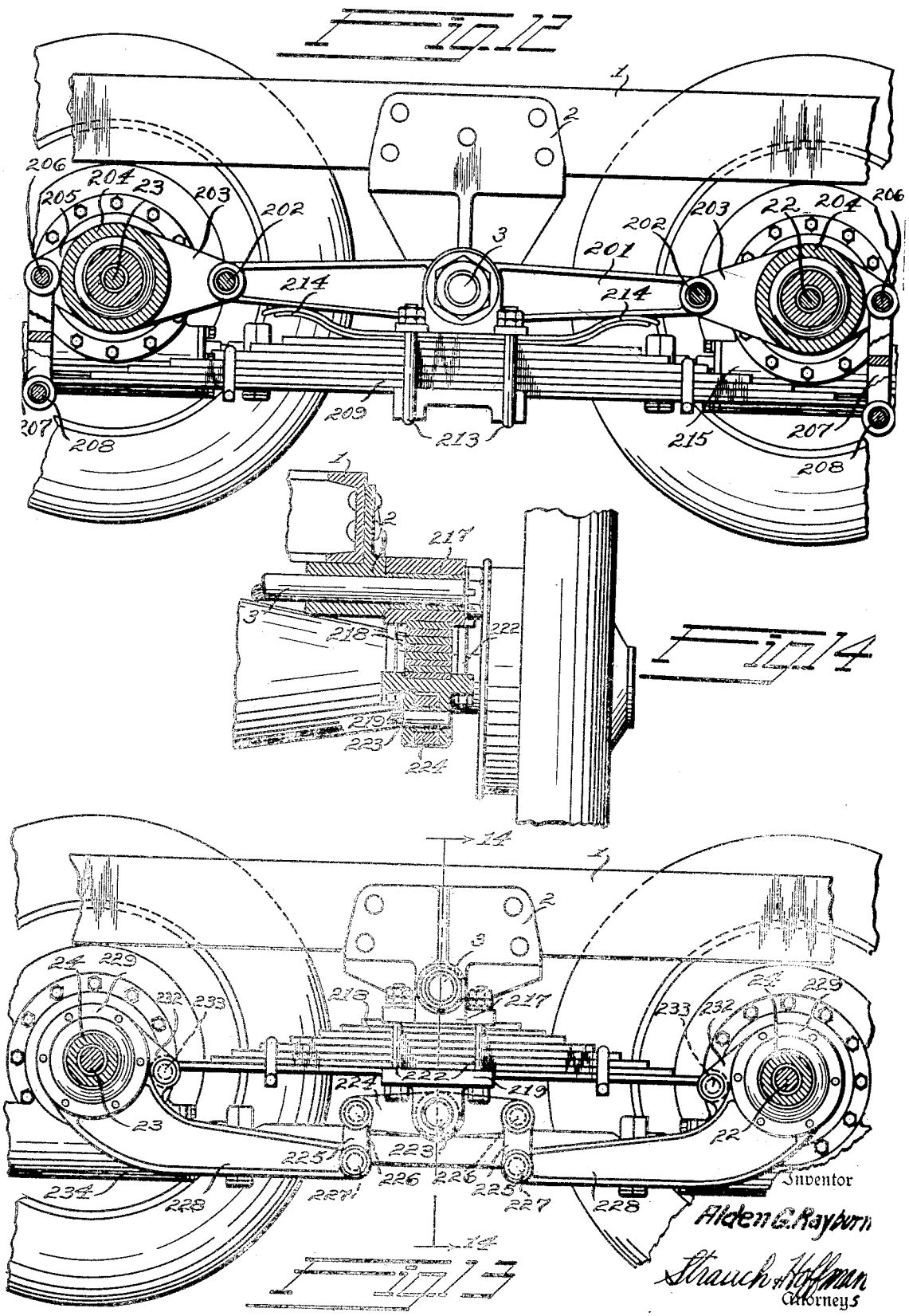

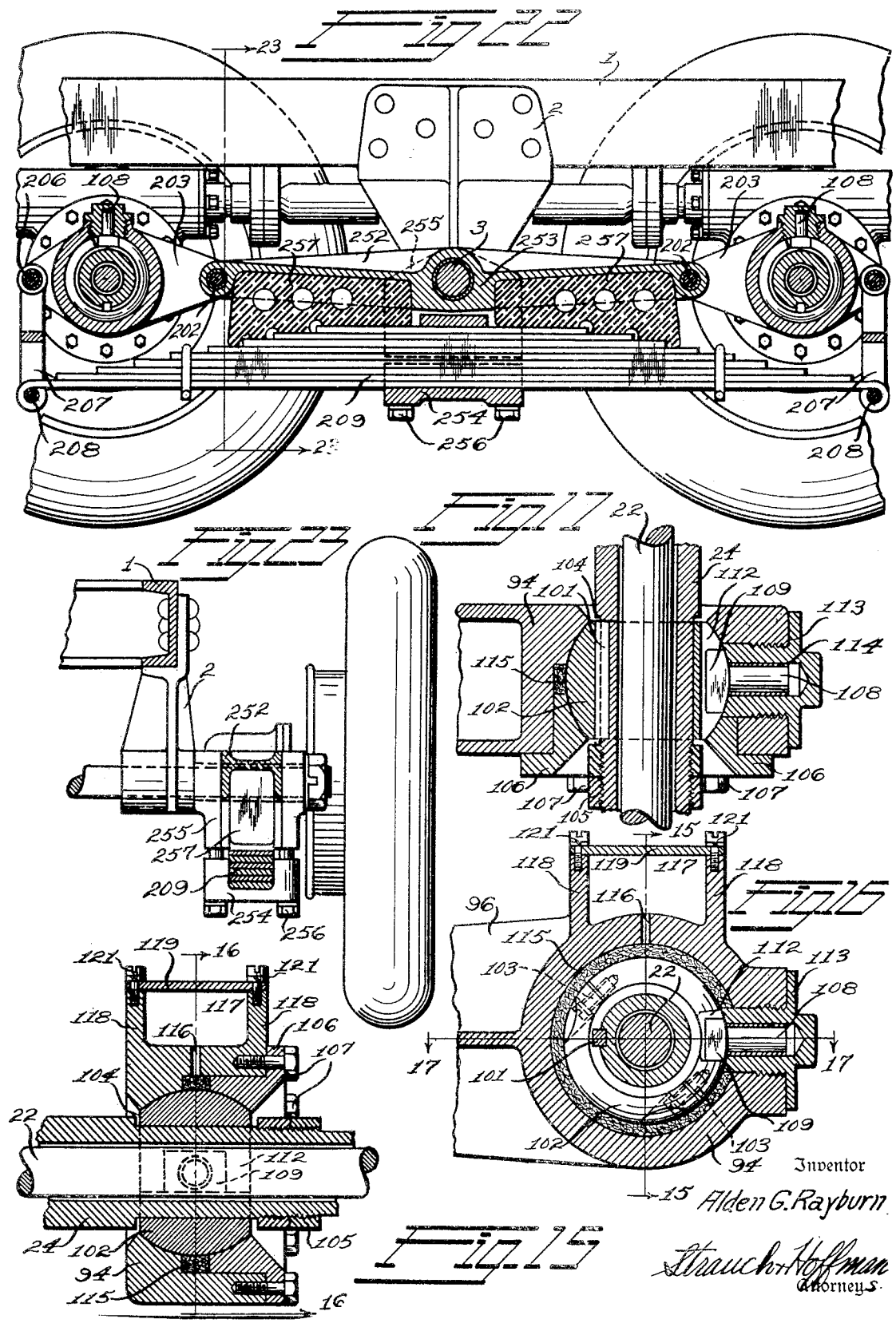

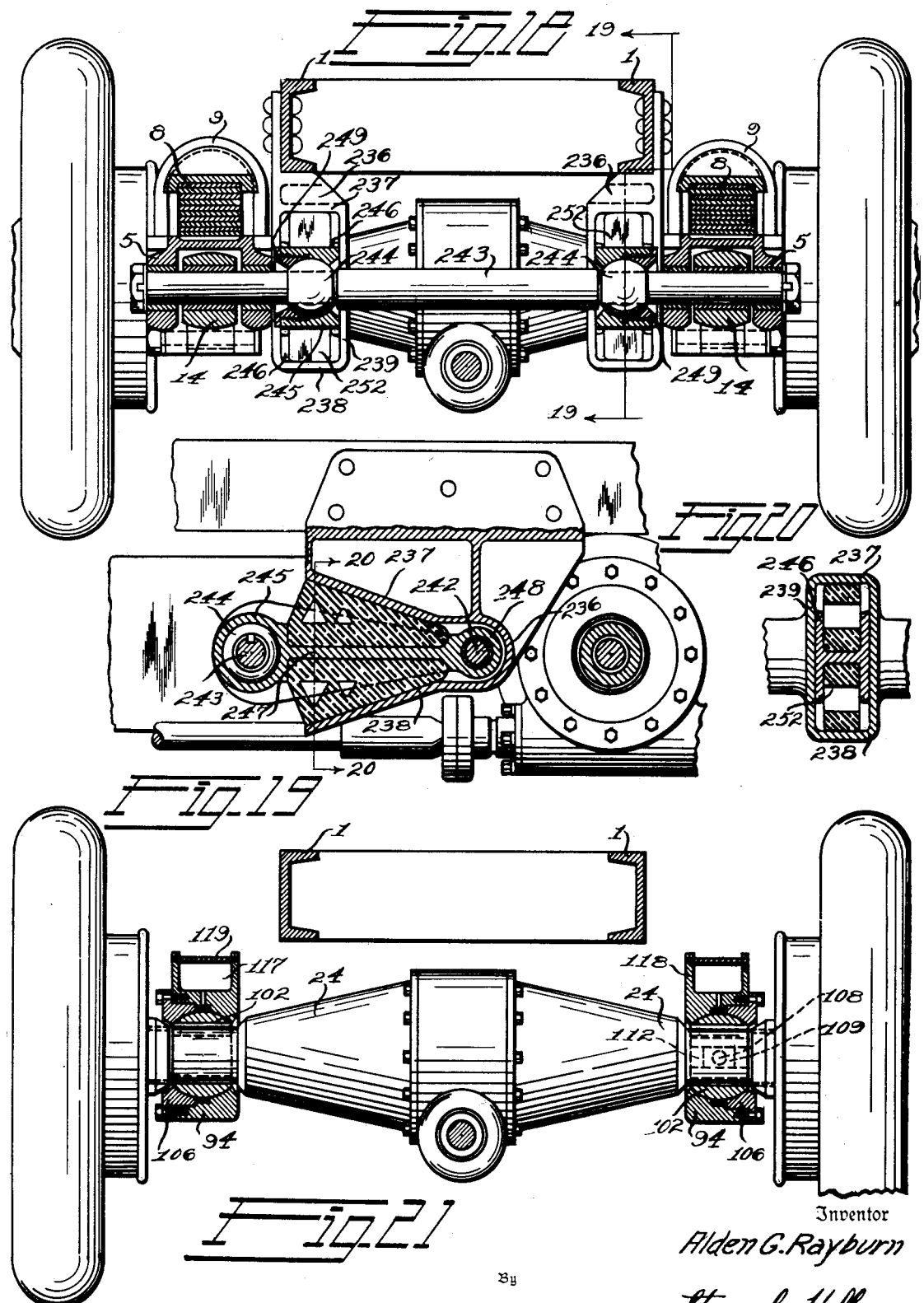

Patented May 30, 1933

1,912,308

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

COMPENSATING SPRING SUSPENSION FOR VEHICLES

Application filed February 5, 1930. Serial No. 426,082.

This invention relates to resilient suspensions for vehicles such as motor trucks, motor busses or coaches, rail cars, and the like, and more particularly to resilient suspensions for tandem axle constructions. This suspension is especially adapted for use with tandem axles positioned at one end or both ends of a multi-wheel vehicle.

Broadly, my invention has for its object the provision of a spring suspension for the tandem axles of a multi-wheel vehicle which permits independent vertical movement of the axles, and which minimizes the road shocks transferred to the vehicle frame.

Another object of this invention is to provide a resilient suspension for tandem axles of a multi-wheel vehicle in which road shocks are absorbed partially by a secondary compensating mechanism.

Another object of this invention is to provide a resilient suspension for the tandem axles of a multi-wheel vehicle in which a resilient member functions as a primary support for the load and road shocks at one axle are partially absorbed by a secondary supporting and compensating means, which transmits a portion of said shocks to the opposite axle and to the other end of the resilient member.

Another object of this invention is to provide a compensating suspension for multi-wheel vehicles in which road shocks are in part transmitted longitudinally of the frame from one axle to the other and are dissipated without substantial vertical shocks to the frame.

Prior attempts have been made to design spring suspensions to accomplish this result, but such attempts have been only partially successful for various reasons. In some constructions two or three springs have been used with each set of axles, with interconnections between axles for partially transmitting road shocks from one axle to the other. Such constructions are usually too flexible, allowing the loaded vehicle to assume dangerous angular positions, and furthermore are expensive to install and service, and do not perform in practice the desirable functions for which they are designed.

A further object of this invention, therefore, is to provide a compensating suspension for the tandem axles of a multi-wheel vehicle using a single spring for the axles, in combination with compensating and balancing means to provide necessary flexibility to allow road shocks to be partially equalized without transmission to the vehicle frame, yet always maintaining the load in balanced relation and in proper position.

Another object of this invention is to provide compensating suspension for the tandem axles of a multi-wheel vehicle wherein a single trunnion connects the frame with the suspension, with tandem axles equally spaced from said trunnion and connected thereto by a common spring, with a compensating linkage between the axles for partially changing the vertical thrusts due to road irregularities into short angular movements which are transmitted back to and are more easily dissipated by the spring.

More specifically, another object of this invention is to provide a single spring suspension connected to the tandem axles of a multi-wheel vehicle so designed that in effect road shocks to each wheel are divided into substantially two component forces, a small component part of the shock acting vertically and being transmitted resiliently to the vehicle frame trunnion mounting through one end of the supporting spring; and the remaining and principal part of the shock being transformed into a horizontal component and transmitted indirectly back to the opposite end of the spring by a compensating mechanism, and meeting the oscillation set up in said spring about its trunnion due to the first named vertical movement, the entire shock thus being absorbed without material effect upon the vehicle frame.

Another object of this invention is to provide a spring suspension for multi-wheel vehicles wherein the load is normally carried in balanced relation on a single spring having relatively long arms connected to the axles, and in which road shocks are not entirely absorbed by flexing of the relatively long spring, but on the contrary such shocks are partially absorbed by short and quick angular movements of the hangers which connect the spring with the housing, and which are transmitted to the spring by short levers. By this construction the vertical movements of the axles and wheels due to road variations are primarily converted into arcuate movements about the axles, which movements give quick kicks to the spring by short levers, to thereby quickly flex the spring and dampen out the vibrations thereof.

Another object of this invention is to provide a single spring connecting the tandem axles of a multi-wheel vehicle by universal joint type of hanger in such way as to permit limited vertical movement of the axles without subjecting the spring or torqueing members connected to the axles to strains which they are not designed to withstand.

Another object of the invention is to provide a single spring connecting the tandem axles of the multi-wheel vehicle which has its opposite end pivotally connected to hangers at points offset from the vertical plane of the axle, said hangers being connected to and having limited vertical movement with respect to the axle housings.

Another object of the invention is to connect the tandem axles of a multi-wheel vehicle by a single spring having the opposite ends pivotally connected to hangers, which hangers are connected to and have limited universal movement with respect to the axle housings, the relative movements of each hanger with respect to its axle housing being inter-tied by mechanical connections to the opposite hanger in a manner such as to allow said hangers to support the load.

Another object of the invention is to provide a torque transmitting ball hanger which may be mounted on the axle housing of a multi-wheel vehicle and which allows unrestricted movements of the axle and housing in all planes without subjecting the axle housing or the torqueing member to torsional or bending stresses, and yet which provides the necessary torque reactions.

Another object of the invention is to provide a universal joint type of torque transmitting ball hanger which may be mounted adjacent both ends of both tandem axles, allowing unrestricted movements of the axles in all planes without subjecting the axle housing or the torqueing member to any stresses other than torqueing stresses.

Another object of the invention is to provide a universal joint type of torque transmitting hanger which may be mounted adjacent both ends of both tandem axles of a multi-wheel vehicle and which further releases the torque transmitting member adjacent a wheel which is vertically displaced from the level position, while maintaining full torqueing relation at the hanger adjacent the opposite wheel on said axle. By this construction the twisting movements of each axle about its longitudinal axis are maintained at a minimum, whereby the angularity between the axle and its drive shaft is greatly reduced.

Another object of this invention is to provide a resilient mounting for the trunnion connecting the vehicle frame to the spring suspension of a road vehicle whereby road shocks which are not absorbed by the spring suspension will be further dampened by the trunnion mounting.

Another object of this invention is to provide a resilient mounting for the trunnion connecting the vehicle frame to the spring suspension of a road vehicle, said mounting having incorporated therein rubber members so arranged that they resiliently cushion vertical movements of the trunnion but are not subjected to draw-bar stresses.

Another object of this invention is to provide a resilient suspension interposed between a multi-wheel vehicle frame and the tandem axles thereof having a compensating mechanism embodied in the spring suspension whereby road shocks are to a great extent absorbed and dissipated, with a resilient mounting for the trunnion connecting the spring suspension and the vehicle frame, whereby any shocks transmitted to the trunnion by the spring suspension are further damped.

A further object of the invention is to provide a compensating spring suspension in which resilient rubber members are so combined with the master leaf of the usual form of leaf spring to provide controlled flexibility of the suspension.

A further object of the invention is to provide a compensating spring suspension wherein resilient rubber members are combined with the master leaf of the leaf spring, such rubber members being so designed that they give the added strength usually provided by the load supporting leaves of a leaf spring with the desired flexibility thereof, and they further add to the stability of the suspension by expansion to contraction in all directions to effectively absorb shocks which would otherwise set up waves in the usual leaf spring structure.

These and various other objects will be apparent from the following description and the appended claims when taken in connection with the accompanying drawings, wherein—

Figure 1 is a side elevation partially in section and showing one form of my improved suspension as applied to tandem axles.

Figure 2 is a section on line 2—2 of Figure 1.

Figure 3 is a section of line 3—3 of Figure 1.

Figure 4 is a view similar to Figure 1 showing another form of my invention.

Figure 5 is a longitudinal section of the shock absorbing and centralizing device shown in Figure 4.

Figures 6, 7, 8, 9, 10, 11, 12 and 13 are all views similar to Figure 1, each showing a modified form of my invention.

Figure 14 is a section on line 14—14 of Figure 13.

Figure 15 is a sectional view of my improved universal joint type of hanger, and taken on line 15—15 of Figure 16.

Figure 16 is another sectional view of the hanger of Figure 15 and taken on line 16—16 of Figure 15.

Figure 17 is another sectional view thereof on line 17—17 of Figure 16.

Figure 18 is a transverse section of a vehicle frame taken through my resilient trunnion mounting.

Figure 19 is a sectional view on line 19—19 of Figure 18.

Figure 20 is a sectional view on line 20—20 of Figure 19.

Figure 21 is a transverse section of a vehicle frame showing the positioning of my ball hangers on the axles.

Figure 22 is a view similar to Figure 1 showing another form of my compensating suspension.

Figure 23 is a section on line 23—23 of Figure 22.

In all of the various forms of my invention herein disclosed it will be understood that the suspension shown is arranged on each side of the vehicle frame so that each pair of tandem axles is connected to the frame at each side thereof.

Referring to Figures 1, 2 and 3, the longitudinal side member 1 of the vehicle frame has secured thereto a depending bracket 2 extending below the frame 1 by which the spring suspension is connected to the frame. A cross-shaft 3 is carried by the depending bracket 2, said shaft extending completely across the vehicle and is supported in an opposite bracket, not shown, to thus brace the brackets and reinforce the frame at this point. The shaft 3 is keyed to the brackets as at 4, or is otherwise secured thereto to prevent relative rotation of the shaft and the brackets.

Journalled on the projecting ends of shaft 3 are bearing blocks 5 which, it will be understood, are duplicated at each end of shaft 3. As seen from Figure 2 each bearing block 5 has two spaced bearings 6 and 7 for engagement over shaft 3 with bushings interposed therebetween and on its upper surface said block is grooved to receive the master leaf of a leaf spring 8. The leaf spring 8 is secured to block 5 by a pair of U-bolts or clips 9 engaging over a curved block 11 which partially encases the upper leaf of the spring 8.

Journalled on the shaft 3 over a bushing between the spaced bearings 6 and 7 of block 5 is a rocker arm 14, block 5 and rocker arm 14 being held on shaft 3 by a nut 15 on the end of the shaft. Journalled on the opposite ends of rocker arm 14 are short links 16 and 17 which depend from the rocker arm and are pivotally connected to levers 18 and 19, respectively. As seen in Figure 2, there are two links at each end of rocker arm 18, one on each side thereof.

The supporting bracket 2 is spaced equidistant between two axles 22 and 23 which may both be trailing axles or both driving axles, or one may be a driving axle and one a trailing axle. As shown in this form of my improved suspension the axles 22 and 23 are full floating. Each axle is encased by an axle housing 24, wheels 25 being connected to each axle. As seen from Figure 3 each axle housing 24 is reduced, providing a shoulder 26. Slidably received on the reduced portion of each axle housing 24 with a bushing therebetween is an annular ball hanger supporting member comprising a ring 27 having a spherical external surface, the interior diameter of said ring being less than shoulder 26. Beyond ball hanger 27 each axle housing 24 is threaded to receive a retaining nut 28 and lock nut 29, retaining nut 28 being slightly spaced from ring 27, the shoulder 26 and nut 28 thus allowing slight longitudinal movement of ring 27 on axle housing 24.

Mounted on the spherical external surface of each ball hanger supporting member 27 is a torqueing and supporting member 32 having its interior surface correspondingly shaped to form a working fit with ring 27 and secured thereto by a retaining ring 33 secured to member 32 by bolts 34. The members 32 are similar in construction, the one shown to the right of Figure 1 having the lever arm 18 thereon which extends diagonally downwardly and then substantially horizontally and is connected to link 16. Another and shorter lever arm 35 is integrally formed with member 32 at the right of Figure 1, being duplicated by arm 36 to the left of this figure. Lever arms 35 and 36 have pivot pins 37 and 38 respectively which are positioned approximately in the horizontal plane of the axles 22 and 23, and the ends of the master leaf of leaf spring 8 are pivoted to pins 37 and 38, with bushing interposed therebetween.

Although not shown in detail it will be understood that the axles have interconnecting torqueing members, when the axles are used for driving or braking which allow the axles limited movement longitudinally of the vehicle, such for example as shown in my Patent #1,705,137 dated March 12, 1929, wherein the torque members are telescoping rods.

With the suspension constructed as above described the operation is as follows. First it is to be particularly noted that there is only one trunnion mounting interposed between the vehicle frame and the spring suspension, namely, the trunnion provided by shaft 3. This is a feature of importance which is common to all forms of my invention, since by this construction a greatly simplified suspension is obtained and one in which the load is substantially always maintained in completely balanced relation to the axles.

In the above described form of my invention the single trunnion performs a double duty, first supporting the load by the axles by way of the primary supporting means comprising the spring, and second in providing a pivotal mounting for the secondary supporting and compensating mechanism.

It is desired to call attention to another feature which is common to all forms of my invention, namely, that there is a resilient primary load supporting member, in this case the leaf spring 8, and there is a secondary load supporting mechanism cooperating with an essential to the primary support and further functioning as a compensating and shock-transferring mechanism, in this case the levers 18 and 19, links 16 and 17 and rocker arm 14. With the vehicle in use, the load is therefore applied through a single trunnion in balanced relation between the tandem axles 22 and 23. Due to the application of a load, the trunnion mounting 3 will move vertically downward, and leaf spring 8 will bow slightly upward at its ends, thus tending to oscillate the torqueing and supporting members 32 downwardly about the axle housings. Such oscillating movement, however, is resisted by lever arms 18 and 19 which are connected to the trunnion mounting 3 by links 16 and pivoted rocker arm 14, these arms 18 and 19 being thus placed under tension, and the load is balanced. Thus the load is supported by the combined action of the primary and secondary supporting means, the principal reaction being taken by the primary supporting means, comprising the leaf spring 8, lever arms 35 and 36 and the axles.

As a bump on the road is encountered by the leading wheel, say the wheel to the right of Figure 1, the wheel will momentarily rise. This sudden rise of the wheel is not, however, transmitted entirely to the trunnion and thus to the vehicle by way of the spring, but on the contrary when the axle and the axle housing 24 rise vertically the member 32 may either rise vertically or may oscillate in a short arc about the point 37 as a pivot, depending upon load conditions, the lengths of the various lever arms, and the size of the road bump. Assuming that member 32 moves partly vertically, lever 18 simultaneously moves upward with member 32, thus pushing up on link 16 and pulling down on link 17 by way of rocker arm 14. Since this sudden push on link 16 is not counter-balanced by a corresponding force on link 17, there occurs only a rocking or tilting of rocker arm 14 about the shaft 3 and consequently the vehicle frame 1 is not moved.

This quick downward movement of lever 19 gives the supporting member 32 at the left side of Figure 1 a quick oscillation in a clockwise direction, about its ball hanger supporting member 27, momentarily releasing this end of the spring by the short lever arm 36. This movement allows this end of the spring to momentarily move down a distance equal to the upward movement at its opposite end of the spring. The result of these movements is that spring 8 turns about trunnion 3 since in order to raise the load the spring must have a point of resistance against which the upward thrust may act. But as above described the point 38 moves down the same distance that point 37 moves up, and therefore the point of resistance, namely, point 38, is not positioned to act as a stationary pivot against which the spring may push the load vertically. Therefore, the effective vertical thrust on the vehicle frame is materially dampened.

When the pivot 37 moved vertically due to the original action of the bump a short upward kick was given to the spring, setting up a short oscillation from the right hand end of the spring. When the pivot 38 moved quickly downward, another short oscillation was given to the spring travelling from left to right. Both of these short waves thus set up are of substantially lower amplitude than the normal period of oscillation of the spring 8 if it had a simple cantilever mounting, so that the vertical thrust of the original bump effective on the vehicle frame is materially reduced. The oscillation set in motion from the left hand end of Figure 1 meets the oscillation given to the spring by the original upward movement of point 37, and the two oscillations or waves moving in opposite directions serve largely to dampen each other out.

However, if the vehicle is heavily loaded and the bump encountered is small so that the thrust thereof is nearly vertical, the pivot 37 may not rise bodily as far as above described, but this pivot will move vertically a small distance and will further act as a pivot for the axle and hanger 32. The hanger 32 thus oscillates counter-clockwise, this action being possible since the torqueing members allow the axles to move to a limited extent. This oscillation moves lever 18 downwardly to move lever 19 upwardly thus giving a short upward kick to the left hand end of spring 8. A short wave is thus set up in the spring which dampens out the original short wave given by the original short vertical movement of pivot 37.

In either type of action above described, the compensating mechanism is set into oscillation to transfer a vertical thrust by a road bump into movement longitudinally of the vehicle and resultant vertical movement of the vehicle frame is greatly reduced. By a proper consideration of the normal load applied to the vehicle and the character of the road surface on which the vehicle will be used, the lengths of lever arms 35 and 36 and lever arms 18 and 19 and the normal horizontal position of trunnion 3 with relation to the axles may all be correctly designed to give maximum efficiency of the suspension.

Due to the fact that the load normally tends to oscillate the torqueing and supporting members 32 about trunnion shaft 3 as a pivot, and shaft 3 is offset from the horizontal plane defined by the pivotal points 36 and 37 of the spring, the suspension will automatically readjust itself to balanced position during operation of the vehicle.

The limited longitudinal play of ball hanger supporting member 27 on the axle housing 24 allows the wheel on the opposite end of each axle housing to move vertically without twisting the spring 8. When the one wheel rises, the connecting axle tilts vertically about the contact point of the other wheel with the ground. Therefore the entire axle and axle housing must move bodily toward the level wheel since it moves about a point offset from the horizontal plane of the axle. For this reason the spring will be pulled bodily with the axle unless the ball hanger supporting member can move slightly longitudinally of the axle. Such bodily movement of the spring is objectionable since it tends to twist or pull one portion thereof and subjects the spring to strains in a direction which it was not designed to withstand.

With my construction, however, the ball hanger supporting members 27 can bodily slip on the axle housing a sufficient extent to remain in alignment with the spring, and no twisting effect is set up in the springs.

Referring to Figures 4 and 5, I have shown another modification of my invention, similar reference characters indicating like parts. In some installations it is desirable to provide a longer leaf spring than that shown in Figure 1 and such a spring is obtained by the balanced compensating support shown in Figures 4 and 5. The leaf spring 8 of Figure 4 is materially longer than that shown in Figure 1 and the torqueing and supporting members 32 have the short levers 41 and 42 projecting outwardly from the suspension and from the axle with the leaf spring pivotally connected thereto by pins 43 and 44. It will be noted that the pins 43, 44 are offset from the vertical plane of the axles 22 and 23, as in my prior described construction, the pins being outside of the axles in this modification instead of between the axles as shown in Figure 1. Due to this arrangement the leaf spring 8 may be made materially longer and better flexibility therefor may be obtained, retaining however the advantageous compensating features of Figure 1.

The operation of this modified form of my improved invention is essentially the same as that shown and described in connection with Figures 1 to 3, road shocks being transmitted around the compensating suspension and thus being dampened out in a manner similar to that previously described. The supporting members 32 are mounted on the axle housings by ball hangers similar to those shown in Figure 3.

In order to assist the spring suspension in compensating for larger irregularities in the road surface, and in order to assist the suspension in maintaining the load in balanced relation, the upper portion of the bracket 11 which is securely clamped to the bearing block 5 by the U-bolts 9 has a lever 45 projecting upwardly as shown. This lever 45 is connected by a clevice 46 on a rod 47 of a combined shock absorber and load centering member 48. This member 48 is pivotally secured to the frame 1 of the vehicle by pivot 49 and comprises the cylinder 52 into which the rod 47 extends. Rod 47 has removably secured at its inner end a piston 53 having small openings 54 therethrough for the restricted passage of fluid such as oil. Removable plugs 55 are provided in the cylinder 52 to allow the ready insertion of fluid such as lubricating oil and the end of the cylinder is closed by a cap 56 through which the rod 47 passes, with a packing gland 57 secured thereto as by screw threads for compressing the packing 58 to fluid tight engagement with the reciprocating rod 47. Coil springs 59 are positioned within the cylinder 52, one on each side of the piston 53 for normally maintaining the piston in central position.

The operation of this modified form of suspension is as follows: Due to the fact that the single trunnion mounting 3 is spaced midway between the axles 22 and 23, the load will be equally balanced between the axles. Since the hydraulic shock absorber 48 is connected to the bearing bracket 5 by means of the lever 45 and clevice 46, the two springs 59 will further aid in maintaining a perfect balance of the load. Since the suspension is completely balanced the springs 59 need only overcome the inertia effect of the load in starting and stopping to maintain the suspension in balanced relation.

As a bump on the road is encountered by the leading wheel, for example, the wheel carried by axle 22, the rise of axle 22 will impart an oscillating movement to the torqueing and supporting member 32 about the pivot point 43 for the spring 8. This short oscillation of the member 32 will be imparted to lever 18 and lever 19 by way of rocker arm 14 and thus to the member 32 to the left hand side of Figure 4. In this modification the oscillating movement of torqueing and supporting member 32 which initially receives the road shocks is clockwise, thus imparting a clockwise kick or short oscillation to the corresponding member 32 on the other axle. This short oscillation of the second member 32 results in a quick movement about the axle 23 thereof as a pivot, thus giving a short kick to the spring due to the short lever arm 42. This short kick of the arm 42 sets up an oscillation of small amplitude in the leaf spring 8 which is transmitted back to the pivotal point 43 thus meeting the original small oscillation set up by the wheel which hit the bump. These two oscillations will therefore dampen one another out and vertical movement of the frame due to the shock will be materially reduced.

In this modification, sudden movement of the entire suspension about the shaft 3 as a pivotal axis, is prevented by the hydraulic means 48, since the piston 53 therein is so constructed that the openings 54 will allow the oil to pass relatively slowly therethrough. Thus any attempt to move the suspension quickly about the point 3 will result in a solid blow against the oil contained in the cylinder 52. The springs 59 add to the inherent balancing effect of the suspension, and yet the hydraulic shock absorber and the centering springs have no detrimental effect on compensating action of my suspension.

The form of my invention disclosed in Figure 6 functions in a manner somewhat similar to that shown in Figures 1 to 3. The axles 22 and 23 have the spring 8 connected thereto at points 37 and 38 spaced between the axles with short lever arms 35 and 36 connected to the axles, said lever arms being mounted on the torqueing and supporting members 32. As in Figure 1, there is a common trunnion mounting 3 for the spring suspension but the torqueing and supporting members 32 are not connected to the rocker arm 14 rigidly as shown in Figure 1. Each torqueing and supporting member 32 has a flaring hollow end 62 for the reception of a rubber cushioning member including a combined rubber and spring mounting.

These rubber cushioning members are adapted for reception in the hollow portions 62 and are formed by a centrally positioned plate or spring leaf 63 having eyes 64 and 65 in the opposite ends thereof and being molded into the center of the rubber member 66. The rubber member 66 is molded around the bar 63 and is adapted to be snugly received within the flaring portion 62 of the torqueing and supporting member 32. If desirable, the bars 63 may have slots or openings therein through which the soft rubber flows, to form a locked joint with the bars. Each rubber member 66 has openings 67 therein for adding to the flexibility of the rubber. The rubber 66 extends completely around the eye 64 of the bar 63 and when the cushioning members thus formed are positioned in the flaring cavities 62, pins 68 are passed through the eyes 64, said pins 68 being slightly smaller in diameter than the eyes 64. The eyes 65 of the bar 63 are then secured to the links 16 and 17 in a similar manner to the construction of Figure 1.

The operation of this type of suspension is as follows. When the load is received on the vehicle frame 1 the trunnion 3 is pressed downwardly to place the leaf spring 8 under a bending stress, tending to turn the torqueing and supporting members 32 about their axles 22 and 23. This tendency to turn members 32 is resisted by the rocker arm 14 to which said members are connected, the rocker arm and links being then placed under tension. Since the bars 63 are pivoted to pins 68, the rubber members 66 are pressed on their upper halves against the upper face of the hollow cavity 62. Therefore in addition to the flexibility of the leaf spring 8 there is further provided the inherent resiliency of the rubber members 66 which effectively assist in absorbing any shocks due to road variations.

It will be noted that the pivotal connections 37 and 38 of this modification as well as in Figure 17 are approximately in the horizontal plane of the axles 22 and 23. When the vehicle is in use a bump encountered by the leading wheel is slightly angularly disposed with regard to the vertical axis of said axles and it will be seen that the lever arm defined by arm 35 is almost at right angles to the line of action of the bump on the wheel. Thus there will be a distinct tendency to oscillate the torqueing and supporting member 32 about its axle, since the point 37 at which the load is applied is nearly 90° displaced from the line of action of said bump. If desirable the pivot points 37 and 38 could be made slightly below the horizontal plane defined by the axles 22 and 23, to be positioned exactly 90° from the line action of a bump encountered on the road whereby maximum oscillation of the torqueing and supporting members 32 will be obtained when a bump is encountered.

With the suspension of Figure 6, when a bump is encountered the axle 22, for example, rises and the torqueing and supporting member 32 oscillates quickly about the pin 37 as an axis. This oscillation moves the hollow end 62 of member 32 downwardly and outwardly, thus further compressing the upper portion of the rubber member 66, since the bar 63 will oscillate slightly about its pivot pin 68. Also bar 63 will move slightly in a longitudinal direction but for a very limited extent since the clearance between the pin 68 and the eye 64 is very small. Movement of the torqueing and supporting member 32 on the right of Figure 6 will be transmitted to the same member on the left thereof, but the movement will be materially dampened out by means of the two rubber blocks 66, the one on the right being compressed at the upper side thereof, and the one on the left being compressed at the lower side thereof. However, some oscillating movement will be transmitted to the torqueing and supporting member 32 at the left of Figure 6, which will then oscillate slightly about its axle 23 to pull downwardly on the pin 38 thus setting up a short wave or oscillation in the leaf spring 8. This short wave or oscillation meets the oscillation originally set up in the spring by the wheel first encounterng the bump and the two waves will dampen each other out.

The oscillation of members 32 in this form of my invention are the same as previously described in connection with Figure 1, with the additional desirable features provided by the rubber members.

The slight longitudinal movement of members 32 provided by the clearance between pins 68 and eyes 64 will allow a slight compression of the rubber at the end of the member 66 between the same and the closed end of the hollow cavities 62. The rubber members 66 of this modification further act in an advantageous manner to center the spring suspension and maintaining the load in balanced relation with regard to the axles, since said rubber members tend to maintain the bars 63 in horizontal position. Furthermore, in this as well as in the other forms of my invention, the forward movement of the axles help to center and balance the load. For example, in Figure 6, the load on the vehicle is pulled forward by the spring itself, and the pivotal pins 36 and 37 will therefore tend to maintain a position of horizontal alignment with the axles.

Referring now to Figure 7, this modification carries forward the advantageous features obtained by the use of rubber cushioning members yet maintaining the essential compensating characteristics of the prior forms of my invention. In this modification the leaf spring 8 is replaced by a casting 71 having two hollow flaring ends 72 providing flaring cavities. This casting 71 is pivoted on the cross shaft 3 as in the other forms of my invention. Positioned within each cavity of casting 71 are rubber cushioning members 73 having molded therein flat bars 74 which may be single master leaf springs. These cushioning members 23 have the bars positioned nearer the bottom surface thereof since the necessary flexibility is provided essentially by the upper and larger portions of the rubber.

The bars 74 have eyes 76 and 77 at the ends thereof, the eyes 76 being surrounded by rubber, and the eyes 77 positioned at the projecting ends of the bars. The bars and the surrounding molded rubber, forming the rubber cushioning members, are shaped to be slidably fitted into cavities 72 and are held therein by pins 78, which are slightly smaller than eyes 76.

As in Figures 1 to 3, the pivotal points 77 of the primary load supporting member, in this case comprising casting 71 and the resilient supporting member associated therewith, are offset inwardly of the axles and are carried by short lever arms 79 which are carried by torqueing and supporting members 81. Members 81 are mounted on ball hanger supporting members similar to members 27 shown in Figure 3, and thus supported from the axle housings. Each member 81 has an upwardly flaring hollow end 82 for receiving the rubber cushioning members 83 in which is molded the bars 84 having eyes 85 and 86. Eyes 85 of the bars 84 are pivoted to links 16 and 17 which are pivoted to rocker arm 14.

It will be noted that each rubber cushion has openings therein to add the resiliency thereof, and that the amount of rubber above bars 74 and 84 is materially greater than that below the same, since the compression occurs principally above these bars.

This form of my improved suspension works as follows. When the load is applied, the bars 74 can pivot about pins 76, thus compressing the upper portions of rubber members 73. Due to the tendency of torqueing and supporting members 81 to turn about their axles, the upper portions of rubber members 83 are also compressed. When an obstruction or bump is encountered, member 81 on the axle of the wheel first hitting the bump is oscillated about its pivot pin 77 in a manner similar to the form shown in Figure 1 and previously described, this oscillation being transferred back to the other end of the primary resilient support by way of the secondary supporting and compensating mechanism.

However, the rubber mounting has certain advantages over the spring types. In this form, there are in effect four resilient mountings instead of three, since each rubber mounting acts as a separate resilient member. Also, the rubber members constructed as described tend to maintain their central and balanced position better than the spring members due to the pins 76 which form the pivotal points for bars 74. It will be seen that said pins move about shaft 3 as an axis, and the entire suspension is more perfectly self-centering. A further and important advantage resides in the fact that the rubber members do not transmit waves or oscillations as decidedly as do spring members, due to the fact that the rubber is deformed in shape when under stress, and the internal movements of the rubber when further deformed are quickly dampened by internal friction. Therefore, a bump received on one wheel is more easily dampened out and absorbed by internal movements of the rubber without consequent movement of the supporting members, and therefore the trunnion 3 and consequently the vehicle frame is forced to move only a small amount.

A further and important advantage of this suspension resides in the fact that the bars 74 and the rubber members 73 are separate and distinct from one another and are pivoted on separate pivots. Thus movement at one axle is not transmitted direct by way of a single spring to the other axle, but can only be so transmitted by pivotal movement of separated members and compression of separated rubber members.

In Figure 8 another modified form of my invention is shown wherein the advantageous compensating effect is slightly modified but is still present. In this modification a novel form of torque arm hanger is used which differs from that shown in the previously described embodiments of my invention. In all forms of my invention as thus far described it is necessary to use torqueing connections between axles when either or both of them are driving or braking axles, whether said torqueing connections are springs or are separate torque arms. The separate torque arms being well known in the art, they are not described. However, in several forms of my invention it is unnecessary to use separate torque connections, since I use a novel universal coupling embodying a universal joint between the axle housing and my secondary supporting means which is also my compensating mechanism. By this construction, I am enabled to use a hanger on each axle housing which thus performs three functions, namely, it provides a secondary support for the load, it transfers road shocks from one axle to the other thus functioning as a compensating means for the road shocks, and it functions as a torqueing connection. My improved structure whereby the above advantageous results are obtained is shown in Figures 8 and 9 and in detail in Figures 15, 16 and 17.

Referring to Figure 8, the frame 1 has the bracket 2 thereon carrying the pivot shaft 3 upon which is pivotally mounted the leaf spring 8. In this modification the movement of the vehicle is to the right in the direction of the arrow. The spring at the right hand end has a link 91 pivotally connected at 92 to the master leaf of the spring. Link 91 extends below the horizontal plane of the axles 22 and 23 and shaft 3, it being noted that shaft 3 is in the horizontal plane of the axles. The lower end of link 91 is pivoted at 93 to a combined secondary supporting and compensating member.

This member comprises a unitary structure which connects the two axles 22 and 23, and embodies a hollow end 94 positioned around axle 22 and having an arm 95 carrying pin 93. Integral with end 94 and arm 95 the supporting and compensating member has a channel member 96 extending to the other axle 23. Integrally formed at the other end of channel 96 around axle 23 is the hollow end 97 having arm 98 on which is pivot pin 99 carrying the adjacent end of leaf spring 8. It will be noted that pivot 99 for the left hand end of the spring is offset above the horizontal plane of the axles 22 and 23 for a purpose to be later described. Hollow ends 94 and 97 are mounted on the axles 22 and 23 as follows.

Referring to Figures 15, 16 and 17, the connections to axles 22 and 23 are similar and the connection to axle 22 only will be described. The axle housing 24 has secured thereto a key 101 for connecting a split ball hanger to said housing, said hanger comprising two similar members 102 secured together in assembled relation around the axle housing by bolts 103. The ball hanger provided by members 102 has a sliding fit on axle housing 24 on a reduced section thereof between a shoulder 104 of the housing 24 and lock nuts 105, whereby the hanger may move to a limited extent longitudinally of the axle housing, but the key 101 insures that these members cannot rotate relative to one another. This limited longitudinal movement is provided so that when the wheel on the opposite side of the vehicle rises the spring will not be placed under a sidewise pull or stress. This feature of the present form of hanger works in a similar manner to ball hanger 27 shown in detail in Figure 3 and the operation of which has been described.

In this form as well as in the ball hanger shown in Figure 3, the forward movement of the wheels and axles will normally maintain the ball hangers in central position between the stops limiting longitudinal play. However, if found desirable it is within the scope of my invention to provide resilient centralizating means such as small coil springs of equal strength between the limiting stops and the ball hanger, or rubber blocks between these points, such resilient members of course not interfering with the desirable longitudinal movement of the parts, but still being strong enough to return the ball hangers to central position.

The end 94 has an interior spherical surface for engaging the ball hanger 102, a removable closure plate 106 being secured to member 94 by bolts 107 for securing the parts in assembled relation. The actual torqueing between axle housing 24 and member 94 is by way of a universal key 108 having a head 109 which is received in a slot 112 in ball hanger 102. As seen in Figure 17 slot 112 is longer than head 109 of universal key 108 to allow longitudinal movement. Universal key 108 is carried in a plug 113 removably received in a threaded opening of member 94, there being a bushing 114 interposed between key 108 and the plug. The inner end of plug 113 is spherically formed to engage the spherical surface of ball hanger 102.

The closure plate 106 has a notch therein to accommodate plug 113. In order to lubricate the engaging surfaces of the ball hanger, the member 94 has a groove in the inner face thereof in which is positioned a felt washer 115 in communication with a lubricant reservoir 117 by a conduit 116. Reservoir 117 is provided by upwardly extending walls 118 of member 102, and is closed at the top by plate 119 secured in place by bolts 121. When the chamber 117 is filled with lubricant, the felt washer 115 is continually lubricated by way of channel 116 and the spherical surfaces are continuously lubricated by the rubbing of member 102 on felt 115.

The split form of ball hanger greatly simplifies assembly of the parts on any form of axle. Although this form of support is shown and described in connection with my compensating form of suspension it is not so limited but on the contrary it is of broad application, being advantageous in every form of torqueing connection for axles, whether the torque reactions are taken by the supporting springs of the vehicle or by separate torque rods.

The bottom of slot 112 in the member 102 is curved, as seen in Figure 16, about the center of the axle, so that the corners of the head 109 of the pin will not engage the bottom of the slot during certain movements of the axles. Also the slot is wider than the head 109 as seen in Figures 15 and 16 to allow full play of the axles and housing without subjecting the housings to a twisting stress when one wheel rises due to a bump, as will be explained more fully.

The torqueing reactions of the axle housings 24 are transmitted to the vehicle frame or to the other axle by the ball hanger 102 keyed to the axle housing, to the head 109 of the universal key 108 engaging one side wall of slot 112, and thus to torqueing member 94 and 96. There is a limited longitudinal play of the hanger 102 on the axle housing 24 between shoulders 104 to allow the wheel on the opposite side of the vehicle and connected to the axle to move vertically without twisting the leaf spring. When one wheel rises from the horizontal level of the other wheel, their common axle tilts vertically about the contact point of the wheel remaining on the level. Therefore the entire axle and its housing must move in a large arc and must therefore move closer to the level wheel. Due to this movement, the spring and the torqueing rods, if such rods are separate from the spring will be pulled cross-wise of the vehicle unless the supporting ball hanger can bodily slip longitudinally of the axle housing. With my construction the ball hangers 102 may slip along the axle within the limits of shoulders 104 sufficiently to remain in alignment with the torqueing spring or torque rod connected thereto.

Furthermore, the head 109 may move longitudinally in slot 112, the torqueing member 94 thus moving away from its normal position at right angles to the axle, and turning about the ball hanger 102, thus oscillating to a limited extent.

For varying degrees of movement of the axle housing out of its normal horizontal plane the universal key 108 may rotate within block 113 about its own axis, whereby the axle may ride over irregularities in the road surface without twisting spring 8 or a torqueing rod connected to support 94, since when the axle rises the member 94 oscillates about ball hanger 102 and universal key 108 rotates about its own axis.

By the above-described novel construction of support between an axle and its torque member, I am enabled to secure a universal joint effect which compensates fully for all abnormal positions of the axles due to road irregularities, and I may therefore use my supporting construction on both sides of all axles in multi-wheel vehicles, whether the torqueing members are rigid or flexible.

The operation of the support shown in Figures 15, 16 and 17 whereby the above advantageous results may be accomplished, is as follows:

If a wheel on one side of the vehicle encounters a bump, the axle moves upwardly in a long arc about the pivotal support for its torque arm. If the opposite wheel on the same axle stays level, one end of the axle housing thus moves to a very limited extent longitudinally of the vehicle toward the pivotal support of the torque arm, such movement being much greater at the wheel which engaged the bump. By the provision of the clearance between the depth of head 109 and its slot 112, as seen in exaggerated form in Figure 16, the housing 24 and its ball hanger 102 may move in an arc about the pivotal support for torqueing member 96 and the head 109 will not bind against the slot. Yet this clearance will not detrimentally interfere with the normal torque reactions between ball hanger 102 and housings 94, since these members can never resist each other in the plane of the paper of Figure 16, for example, which resistance would result if the universal key on the rising wheel did not release the axle housing, said axle housing thus taking the minimum rotation about its longitudinal axis.

With a rigid drive axle 22 between opposite wheels, the driving or braking torque will momentarily be released from the torque arm at the wheel which hit the bump but will be maintained at the torque arm of opposite wheel. However, when this action occurs the head 109 is released from torqueing reaction only a very small distance and there will be very little, if any, shock when the head 109 re-engages the wall of slot 112.

Thus it will be seen that the above-described novel supporting connection between an axle housing and its torqueing member allows full play of the parts for all of the various angular positions which the axle housing may assume without subjecting the torqueing members to angular or twisting strains which they are not designed to withstand. I have thus provided in effect a universal joint with provision for taking torque reactions and in addition allowing full play in all directions other than that of the torque reactions. It will be obvious that the pin 108 and the slot 112 could be reversed, that is, the pin could be carried by the ball hanger 102 and the slot 112 could be provided in member 94.

Returning now to the operation of Figure 8, when a bump on the road surface is encountered by wheel A, which is always the leading in this form, the axle 22 will rise and the secondary supporting member 96 will oscillate about the point of contact of wheel B with the ground, since members 94, 95, 96 and 97 are rigid. Thus pin 93 will rise practically vertically to thus give a short upward kick to the right hand end of spring 8.

At the same time, the member 97 of wheel B moves counter-clockwise, thus moving short lever 98 counter-clockwise with a short kick. This movement is about axle 23 as a center, and pin 99 will thus move upward and to the left as seen in Figure 8, since this pin is well above the line of centers of axles 22 and 23. This movement of pin 99 will give a short upward kick to leaf spring 8 which will set up a short wave therein which will meet and dampen the short wave given to the spring by vertical movement of wheel A. The movement to the left of pin 99 furthermore tends to give the entire spring 8 a movement to the left about pivot support 3 thereof, the link 91 moving about pin 93 to allow bodily movement of the spring. Thus the spring is simultaneously given a combined short bend and a pull to the left, which combined actions effectively absorb the original shock and the vehicle frame movement is materially reduced.

The form of my invention as shown in Figure 9 uses a ball hanger on the right side thereof similar to those used in Figure 8 and shown in detail in Figures 15, 16 and 17, whereas the hanger at the left side thereof may be similar to that shown in Figures 1 and 3. In this form, the leaf spring 8 has a pivot pin 124 to which is connected a link 125 pivotally connected by pin 126 to a short lever arm 127. Arm 127 is rigid with a supporting member 128 which is connected to the axle housing 24 by a pin 108 in a similar manner to the member 94 of Figure 8.

Rigid with member 128 and lever 127 is a bell-crank lever 131 pivoted about shaft 3 which also pivotally supports the leaf spring 8, the short lever 132 of the bell-crank projecting downwardly. At its lower end, the lever 132 is provided with a central chamber 133, closed by a removable side plate 134. Within chamber 133 is positioned a resilient cushioning member including two semi-spherical cups 135 enclosing a metal ball 136 having an arm 137 projecting through an opening in the side of chamber 133, cups 135 being integrally molded into a rubber cushioning block 138. The opening in chamber 133 through which arm 137 passes allows sufficient clearance to allow oscillation of arm 137 without binding.

Arm 137 is threadedly engaged in a link 139 and locked by a lock nut 141, the other end of link 139 receiving an arm 142 having a ball 143 thereon within a hollow housing 144. The housing 144 and ball 143 are similar to housing 133 and ball 136, with similar semi-spherical cups and rubber cushioning member 138'. Housing 144 is carried on the depending end of a short lever arm 145 of a supporting member 146 mounted on the axle housing 24 as shown in Figure 3 or in any other suitable manner. Supporting member 146 has a short lever 147 pivotally supporting leaf spring 8 by a pivot pin 148.

The operation of this suspension is as follows, the wheel A being the leading wheel and preferably the driving wheel with wheel B a trailer. When a bump is encountered by the leading wheel A, the entire support must move about pivot 3 as a center, thus giving a short vertical kick to the spring by vertical movement of pin 124. Simultaneously the bell-crank lever 131 moves upwardly in a counter-clockwise direction about shaft 3, thus pulling to the right on the short lever 132. Due to the lengths of arms 131 and 132 of the bell-crank, the movement of lever 132 is relatively small. This short movement is transmitting by link 139, and levers 145 and 147 to pin 148 to give a short upward kick to the spring. However, the rubber cushioning members 138 and 138' serve to effectively dampen these movements and the compression of the rubber materially softens the road shocks, the semi-spherical metal cups interposed between the balls 136 and 143 preventing the rapid wear of the rubber.

It will be noted that the pin 148 is above the horizontal plane defined by axles 22 and 23 and above shaft 3 and therefore the entire spring tends to shift slightly to the left about shaft 3, when the hanger 146 oscillates as above described. There is thus an upward kick at the left of the spring simultaneously with a pull on the same end, since pivot pin 148 tends to move to the left. This double movement effectively dampens out oscillations of the spring and the resultant vertical rise of the vehicle frame is greatly reduced.

In Figure 10 I have shown a further modification which exemplifies another form wherein the compensating characteristic of my broad invention is present. In this form the leaf spring 8 is supported from the pivot shaft 3 and is connected at its two ends to similar supporting members carried on the axle housings. The right hand end of the spring is supported on a pivot pin 151 carried on short lever 152 of member 153 supported on the axle housing 24 by a ball hanger which may be similar to that shown in Figure 3. Supporting member 153 has a depending arm 154 on the lower end of which is a pivot pin 155 which is normally directly below the axle 22.

Pivot pin 155 is connected to a clevis 156 adjustably connected to a rod 157. Rod 157 passes freely through a slot in a depending portion 158 of the support 5 for the leaf spring 8. Positioned on each side of portion 158 and surrounding rod 157 are coil springs 159 bearing on opposite sides of portion 158 and against adjustable stops 161 comprising lock nuts threaded on rod 157.

The left hand end of rod 157 has a piston head 162 positioned in a cylinder 163 which is pivotally connected by a short arm 164 to pivot 165 of lever 166 carried by supporting member which is similar to member 153. The cylinder 163 is closed by a removable cap 167, and within the cylinder on each side of the piston head 162 are resilient cushioning members comprising rubber blocks 168. Grooves 169 are cut in the interior of the cylinder 163 to give additional resiliency to the rubber blocks by providing additional space into which the rubber may expand.

The lever arm 166 is carried by a supporting member 172 carried by a ball hanger from the other axle housing, and having a short lever arm 173 supporting one end of leaf spring 8 by pivot pin 174.

The operation of this form of my invention is somewhat similar to those forms previously described, the spring 8 comprising the primary load supporting means and the compensating mechanism including rod 157 and levers 154 and 166 comprising the secondary load supporting means. When a bump is encountered by the leading wheel, it being here noted that either wheel may be the leading one in this form, the vertical rise of the axle 22 is partially converted to an oscillation and partially to a vertical reciprocation of support 153. This support gives a short quick kick to the spring 8 vertically, thus setting up a short oscillation therein. The support 153 also oscillates counter-clockwise about axle housing 24, due to the fact that the load is applied vertically downward at pivot pin 151. This oscillation moves rod 157 to the right, compressing one spring 159, and moving piston head 162 to the left. One of the rubber cushioning members 168 is thus quickly compressed, and due to the inherent qualities of the rubber, the movement of piston head 162 is dampened. Some movement however is transmitted to lever 166 and to thus give a quick downward pull on the left hand end of spring 8 by means of pivot pin 174. The short wave thus set up in leaf spring 8 meets and dampens out the original wave set up therein by the bump.

Due to this compensating motion by movement of the secondary support, the resultant vertical movement of the shaft 3 and consequently the frame is greatly reduced. The coil springs 159 will assist in recentering the suspension, it being noted that the load is always completely balanced. The vertical slot in member 158 through which rod 157 passes allows said rod to move vertically, since this movement is necessary when supporting members 153 and 172 oscillate.

Referring to the modified form shown in Figure 11, this suspension in some respects resembles that of Figure 10, but I have taken fuller advantage of the inherently excellent characteristics of rubber mounting. In this form the leaf spring used in other forms is replaced by a radically new type of resilient member. The bracket 2 of frame 1 has the shaft 3 thereon for supporting the primary load supporting member or resilient member. This member comprises two channel shaped members 176, the lower one of which having a bearing 177, the two members being secured together by bolts 178 channel members 176 provide two flaring chambers each adapted to receive a resilient member. Each channel member 176 has a central dividing wall 179 providing a spherically curved opening 181 therebetween.

The resilient member for positioning into channel members 176 comprises a master leaf spring 182 molded into rubber members 183. Each rubber member 183 is shaped to snugly fit into the flaring chambers provided by the two channel members 176 when assembled. The master leaf spring 182 has a spherical indentation therein coinciding with the curved opening 181, whereby the entire resilient assembly is maintained in position against longitudinal slippage and the spring is free to oscillate about the spherical portion 181. The rubber members 183 have openings therein of progressively larger size toward the open ends of the channels to thereby add to the flexibility of the rubber, the movements of the master leaf spring 182 being greatest adjacent the portions of the rubber having the largest openings and the deepest cross-section.

The ends of master leaf 182 project beyond the rubber members 183 and have secured thereto cylindrical members 185. Members 185 are positioned in correspondingly shaped sockets or recesses in short lever arms 186, sleeves of rubber 187 being interposed between portions 185 and the walls of the lever arms 186. The openings in the ends of lever arms 186 and the rubber sleeves 187 are flared sufficiently to allow free oscillating movement of leaf 182 without binding, the assembly of the parts being made from the side, whereby the cylindrical members 185 may be readily inserted. The openings in the ends of the sockets of arms 186 may be closed by a removable plate after the cylindrical members 185 are in position, such plate if desirable being unitary with the plate which bolts to the member 188 to house the ball hanger.

Each lever arm 186 is carried by a supporting member 188 carried by the axle housings 24 with a ball hanger interposed therebetween which may be similar to that shown in Figure 3. Each member 188 has a lever arm 189 thereon projecting inwardly, the inner adjacent ends of said arms having sockets 192. A rod 193 having cylindrical member 194 secured to the ends thereof for receptions in sockets 192, with rubber sleeves 195 interposed therebetween. The rod 193 passes into sockets 192 by way of flared openings, the rubber sleeves also being flared to allow free oscillation of rod 193. The open sides of sockets 192 may be closed by removable plates secured to outstanding flanges of sockets 192 after the cylinders 194 are in position.

The modification operates as follows. When the axle at the right of Figure 11 rises due to a bump on the road, supporting member 188 moves partly vertically and partly in an arcuate path about the axle housing as a center, as previously fully described. This movement gives an upward kick to cylinder 185 whose movement however, is partially dampened by compression of rubber sleeve 187. This upward movement of the right hand end of master leaf 182 further compresses the upper portion of rubber member 183, thus tending to oscillate the entire primary supporting member including channel members 176 counter-clockwise about shaft 3. However, the movement of the parts is dampened by the inherent internal friction of the rubber members. In any event any vertical movement of shaft 3 is of small magnitude, due to the dampening effect of the rubber mounting and due to the compensating action of the secondary supporting mechanism.

Due to the fact that the load acts vertically downward at the ends of master leaf 182, movement of supporting member 188 is to some extent oscillatory about axle 22 as a pivot, thus setting into action the compensating movement of the secondary support, moving lever arm 189 upward with a quick movement, thus pulling the other lever arm 189 by way of rod 193. However, the resultant movement of lever arm 189 at the left is reduced due to the absorption of part of the movement by the rubber sleeves 195. Resultant oscillation of member 188 at the left of Figure 1 imparts a quick movement of cylinder 185 which is partially dampened by the rubber sleeve 187. This movement reacts against the initial movement of the primary load support, and also compresses the rubber member 183 whereby any vertical movement of shaft 3 is materially less than the original vertical movement of the axle and wheel.

In this form of my invention it is to be particularly noted that the primary load support embodies in reality two distinct resilient members, one on each side of the center. Due to the fact that each of said resilient members is made up principally of rubber, there is very little tendency to set up oscillations or waves from one resilient member to the other, since the internal friction of the rubber absorbs, to a great extent, the movement, and due to the fact the master leaf spring member 182 is held at its center. The compression of the rubber on one side of shaft 3 acts on the pivoted primary supporting channels 176 to move said members about shaft 3, to thus compress the rubber member on the other side of the shaft. Thus the rigid channels 176 may pivot without imparting vertical movement to the shaft 3.

Referring to the modification of Figure 12, the parts are so arranged that a longer spring may be used, with the pivotal connection between the frame and the suspension being in the horizontal plane of the axles. As shown, the shaft 3 pivotally supports a rigid lever 201 carrying pivots 202 at the ends thereof and connected to short levers 203 of supporting members 204 which are mounted by ball hangers from the axle housings. On the opposite side of the axles, the supporting members carry short levers 205 having pivots 206 on which are pivoted depending links 207 of H form, since by my construction these links are normally under heavy tension.

In some of the prior forms of my invention I have designed the suspensions so that the supporting members carried by the axle housing and connected to the primary load supporting means also functioned as torqueing members. In the present form as disclosed in Figure 12, however, the supporting members 204 are not torqueing members and it is necessary to provide separate torqueing means for the axle and axle housings. Such torqueing means may be of any well known type to take the torqueing reactions due to braking or driving between axles or from the axles to the frame, and still allowing proper freedom of motion of the axles.

The links 207 have pivot pins 208 at the lower ends thereof to which are secured the opposite ends of a leaf spring 209 pivoted by bracket 212 and U-bolts 213 from the trunnion shaft 3. The stresses imposed upon this suspension are completely balanced, and in order to assist the suspension to maintain itself in centered position, addition leaf spring 214 may be mounted on top of leaf spring 209, being secured to spring 209 by the U-bolts 213. Springs 214 engage the lower side of pivoted lever 201 equidistant from the pivot 3 thereof, so that the lever 201 and the entire suspension is maintained in central balanced position. Since the entire suspension is balanced and the forces are equidistant from the pivot 3, the springs 214 need only overcome the inertia and friction of the parts.

In this form of my invention the axles are both drive axles, being driven from an inverted worm drive 215 of standard and well known construction, although either or both may be trailing axles.

It will be noted that the pivot pins 202 and 206, axles 22 and 23, and shaft 3 are all in a common horizontal plane, and since the pivot pins 206 are beyond the axles, the leaf spring 209 is longer than in some of my improved suspensions.

The form of my invention shown in Figure 12 operates as follows. When a road shock is encountered, say by the wheel at the right of Figure 12, the rise of pivot 202 raises the right hand end of lever 201 about shaft 3 as a pivot, since this lever need only overcome the relatively light springs 214. At the same time pivot 206 on the right hand wheel rises, pulling upwardly to give a quick kick by link 217 to the right hand end of spring 209 which constitutes the primary load supporting means in this form. A short wave is thus set up in the spring 209.

When the secondary load supporting member comprising lever 201 moved counter-clockwise about pivot 3, the pivot pin 202 at left of Figure 12 was depressed, thus giving a quick oscillation to left hand support 204 in a clockwise direction about axle 23 as a pivot. This movement pulls up on left hand link 207 to give a quick upward kick to the leaf spring at this end, setting up a short wave which meets and dampens the wave set up therein from the right hand end.

Since the connection between the suspension and the vehicle frame is by way of shaft 3, pivoted movement of lever 201 has no effect in lifting the load. Also, since the spring is carried below shaft 3, the initial upward movement at the right end of the suspension is partly resolved into a counter-clockwise oscillation of the spring about shaft 3. Thus there will be little vertical movement of shaft 3 due to the road shock and the effect thereof on the vehicle is materially softened and reduced.

In Figures 13 and 14 I have disclosed a further form of my improved suspension which is completely balanced and in which the desirable self-centering characteristic is further accentuated to a marked degree, such self-centering being accomplished automatically without the use of additional springs. The frame 1 has the bracket 2 thereon supporting shaft 3. Shaft 3 has a bracket 217 pivoted thereon with a bushing interposed therebetween, the bracket being grooved on the bottom face to receive the upper leaf of leaf spring 218. Spring 218 is secured to pivoted bracket 217 by a lower bracket 219 secured to bracket 217 by U-bolts 222.

The lower bracket 219 has a pivot pin 223 secured between a bifurcated portion thereof for pivotally supporting a rocker arm 224 with a bushing therebetween. The rocker arm 224 has links 225 pivoted at the ends thereof on pins 226, the lower ends of links 225 having pivot points 227 for supporting lever arms 228 from the rocker arm 224.

The levers 228 are part of or are rigidly secured to supporting members 229 having short lever arms 232 projecting toward the leaf spring 218, the members 229 being carried by ball hangers which may be similar to those shown in Figures 1 and 3 and carried by axle housings 24. Lever arms 232 carry pivot pins 223 connected to the master leaf of leaf spring 218. An inverted worm gear drive 234 for both axles is shown which may be of any well known form.

This construction as described resembles in some respects the form shown in Figure 1 but it has certain different characteristics in operation and in some respects embodies an improvement over Figure 1. It will be noted that pivot pins 233 are offset below the horizontal plane of the axles 22 and 23, and the lever arms 232 slant upwardly. This feature is of importance for the following reason.

When a bump on the road is encountered it is not directly below the axle but is offset from a vertical line through the axle in the direction of movement of the vehicle. Therefore, the line of action of the force set up when the axle encounters a bump is diagonally toward the rear of the vehicle. By having the short lever arms 232 at an angle, these lever arms may be positioned at right angles to the line of force of a bump, to thus accentuate the oscillating movement of supporting members 229, and to thus set into movement the novel compensating action of my secondary supporting means. Furthermore, by positioning the pins 232 below the plane of the axles, the self-centering effect is amplified, since these pins carry a vertical thrust due to the load of the vehicle, the effective action of which is below shaft 3 and below the axles.

The operation of this suspension is as follows. The load tends to oscillate supporting members 229 counter-clockwise about the axle housings thus putting links 225 in vertical tension. These links thus pull downward on rocker arm 224 which is pivoted to bracket 219. Since links 225 are connected to rocker arm 224 equidistant from pivot pin 223, and since the downward pull on these links 225 is equal, the result is the same as if the load were suspended to pin 223 which may swing freely below shaft 3. The pin 223 will therefore always automatically recenter itself directly below shaft 3.

Furthermore, it will be noted that the parts comprising spring 218, bracket 217, and rocker arm 224 are suspended below shaft 3, and the combined weights thereof will further assist in maintaining the suspension in centered position.

Another decided advantage of the suspension of Figure 13 lies in its ability to lift the load of the vehicle in starting. As is well known, when a heavily loaded vehicle starts up the driving axles tend to pull away from under the load, since the inertia of the load tends to maintain it at rest. This usually results in the springs straightening out or flattening and the vehicle frame coming closer to the ground, and placing the parts under heavy strain. However, with the above construction, when the driving axles start to move in relation to the frame, the suspension will be momentarily pulled off center about shaft 3. Due to the above described tendency to automatically re-center itself, there will be a resultant lift on shaft 3 and the loaded vehicle will thus be given a slight lift, thus materially assisting in starting the load.

This advantageous lifting of the load is further present in a marked degree in this form of suspension, for the following reasons. If the vehicle frame moves in relation to the suspension and the axles, such movement must be about shaft 3 as a pivot. Since the load is acting vertically downward on rocker arm 224 carried on pivot 223, any movement of point 223 away from vertical must thus necessarily lift on the load, since pivot 223 must move in an arc about shaft 3. Thus, when the vehicle starts up the inertia of the loaded frame holds back and pivot 223 will swing about shaft 3. Therefore pivot 223 must rise and such rise must necessarily give an upward lift on the load.

When an obstruction is hit by the leading wheel, say the right hand wheel, the angle at which said obstruction acts against axle 22 lifts the supporting member 229 and pin 233. However, member 229 will partially oscillate about pin 233 also, due to the right angled relation of lever arm 232 with the line thrust set up, whereby the angular movement of member 229 about 233 as a pivot will be accentuated. A short upward movement will be imparted to the spring 218 at the right hand end thereof, and lever 228 will quickly move downwardly about pin 233, transferring its motion to an oscillation in a counter-clockwise direction to member 229 on the left hand wheel. This sets up a short wave in spring 218 from the left hand end thereof to dampen out the original vibration. The original bump will therefore have a greatly reduced effect on the load by upward movement of shaft 3. For the reasons previously given, the suspension will automatically re-center itself.

In the forms of suspension as thus far described, I have used a single trunnion between the vehicle frame and the suspension, this trunnion being fixedly connected to the frame. However, in some instances it is desirable to provide a flexible mounting for the trunnion in addition to the flexibility provided by the vehicle spring suspension, whether or not such spring suspension includes the novel compensating characteristics as described in my prior forms.

Figures 18, 19 and 20 show one form of flexible mounting for the trunnion which is shown in connection with a compensating suspension but is not limited to use therewith. Referring to Figures 18 and 19 the vehicle frame 1 has depending brackets 236 on opposite sides of the vehicle for mounting the suspension and axles on the vehicle. Each bracket 236 is secured to the frame by a plurality of securing members such as rivets, and are positioned between the tandem axles of a multi-wheel vehicle but offset from mid-position, being closer to one axle than the other. Each bracket has an upper wall 237 and a lower wall 238 which flare outwardly toward the other axle, and side walls 239, defining a hollow chamber with flaring upper and lower walls and open at one end. Adjacent the closed end of this chamber the vertical walls 239 provide a bearing for a pivot pin 242 which may if desirable, extend across the vehicle frame and be supported by both brackets.

Positioned midway between the axles 22 and 23 and in the horizontal plane of pivot pin 242 is a trunnion 243 which extends across the vehicle and is connected by springs to the two tandem axles. The trunnion 243 has two ball hangers 244 mounted thereon for limited longitudinal play on the trunnion. Members 245 pivotally connect trunnion 243 and pivot pin 242, each of said members comprising two spaced vertical walls 246 connected by a horizontal section 247, thus forming an H section. The vertical walls 246 are of such width as to be received between wall 239 of bracket 236, and are of less height than walls 239. Each H member 245 has a hub 248 at one end with an opening therethrough to receive pivot pin 242 with a bushing therebetween. At its other end each H member 245 has a hub with a spherical inner surface for cooperative engagement over ball hanger 244, a removable closure plate 249 securing each member 245 on its ball hanger 244. Suitable lubricating means may be provided for the joints between ball hangers 244 and the H sections 245, such for example as the oil reservoir 117 of Figure 15.

Each H member 245 has united thereto rubber cushioning members 252, these rubber members being preferably molded around the H member. These rubber members are enclosed between the vertical walls 246 of the H members and are shaped to be slidably received in the flaring chambers of the brackets 236. As seen clearly in Figure 18, there is a clearance between the vertical walls 239 of the flaring chamber and the rubber members, to provide openings into which the rubber may flex when compressed by the H member 245. As seen from Figure 19, openings of progressively increasing size are provided in the rubber members on both sides of the horizontal web 247 of the H member. Although I have disclosed solid rubber cushioning members for the lever arms 245, it will be understood that the invention is not so limited, since I may use other resilient means, such as springs, pneumatic rubber members, or a combination of springs and rubber.

The trunnion 243 extends beyond the ball hangers 244 thereon and pivotally supports a compensating spring suspension. This compensating suspension may be any of the types disclosed in this application, or any other spring suspension, whether of the compensating type or not. The novel resilient mounting whereby the trunnion to which the axles are connected by springs may oscillate with respect to the vehicle frame, with resilient means to control this oscillation, is of broad application and may be applied to various forms of supensions.

This resilient mounting for the trunnion provides an especially effective support for the tandem axles of a multi-wheel vehicle when equipped with compensating suspensions, since the compensating means materially reduces vertical movements of the trunnion, and the resilient mounting for the trunnion then further decreases the small vertical movements of the trunnion so that the vehicle frame is substantially unaffected by ordinary variations in the road surface.

As seen in Figure 18, the trunnion 243 has rocker arms 14 thereon with brackets 5 carrying leaf springs 8 by U-bolts 9, all as shown in detail in Figures 1 to 3.

With trunnions mounted as thus described the operation is as follows. The pivot pin 242 may be mounted on the vehicle either in front or in back of trunnion 243. If mounted in front of the trunnion the drive from the wheels to the vehicle will be a pushing motion, and if in back of the trunnion the drive will be a pull, but in either case the longitudinal strain will be taken by the H member 245, whether said member be in compression or tension. It is noted that the horizontal position of the pivot pin 242 as shown in Figure 18 is the fully loaded position of the vehicle. The rubber members 247 are to a great extent relieved of longitudinal tension.

When a bump on the road surface is encountered, the springs connected to the axles absorb the vertical shock as far as they are able to do so, depending upon the efficiency thereof. With my compensating suspension this vertical shock is materially reduced. Any resulting vertical movement of trunnion 243, however, oscillates the H member 245 about pivot pin 242 thus compressing the upper rubber member 247. Due to the openings provided in said member and the clearance between the vertical sides thereof and the walls 239, the rubber member is compressed. This compression causes the rubber to change form or to "flow" and as is well known the internal friction of the rubber to a great extent absorbs the compression and the tendency to set up a wave is materially reduced. There is thus a pressure against the upper wall 237 of the bracket which progressively increases the further the trunnion is moved from its normal position. Sudden small road shocks will be unnoticeable on the vehicle frame, and larger shocks will be materially softened and dampened.

With the trunnion supported as in Figure 19, the draw bar push and pull will be directly transmitted between trunnion 243 and the pivot 242 on the vehicle frame by longitudinal thrust on the H member 245, and the cushioning members need only sustain the vertical thrusts.

The ball hangers 244 allow the trunnion 243 to move vertically, and to also tilt into a slanting position, as when one or both wheels on one side of the vehicle rise, without subjecting the H members 245 to torsional stresses.

From an inspection of Figure 19 it will be seen that the trunnion is secured to a member which may oscillate about the pivot pin 242. Although I have shown only one arm secured to hub 248 with rubber members on opposite sides thereof, arranged to form a sector of a circle, it is within the scope of my invention to use a plurality of such sectors in order to increase load carrying capacity of the trunnion or to meet other problems of a practical nature which may arise.

Figure 21 illustrates a slightly modified form of hanger, resembling in some respects that shown in detail in Figures 15, 16 and 17. Similar reference characters indicate like parts shown in Figures 15, 16 and 17. The supporting member 94 to which the leaf springs 8 are connected are mounted on ball hangers 102 suitably keyed to the axle housing 24, said ball hangers being free to adjust themselves slightly longitudinally of the axle housing for the reasons fully given in the description of Figures 15, 16 and 17. It being understood that if in practice this movement is found to be unnecessary that the ball members can be permanently mounted on the axle housing. The closure plates 106 releasably secure the members 94 in position, and lubrication of the ball joint is accomplished by an oil well 117. In this form of my invention, however, I use one universal key 108 on each axle housing, preferably on alternate sides of the vehicle. As seen in Figure 21, the axle housing 24 has only one universal key 108 at the right hand end thereof. The adjacent axle is provided with one universal key 108 also, preferably at the left hand side thereof, for the following reasons.

The slot 112 in the ball 102 is of the same width as the head 109 of the key and in order to allow one wheel to rise over a bump, thus oscillating the axle housing at one end about its trunnion, without subjecting the housing to a torsional strain, one key only is used on each axle.

Referring to Figures 22 and 23, I have shown a compensating suspension which somewhat resembles that shown in Figure 12 and similar reference characters indicate like parts in these views. The form of suspension in Figures 22 and 23, however, differs from that of Figure 12 by substituting a different lever for lever 201 of Figure 12, with a different resilient centering means, using however the hanger support shown in detail in Figures 15, 16 and 17.

In this form a lever 252 is pivoted on trunnion 3 and is connected at its opposite ends to pivot pins 202 of lever arms 203. The lever 252 is an H in section, having an enlarged hub portion 253 at the center for pivotal mounting on trunnion 3 which is carried by bracket 2. The leaf spring 209 is supported from trunnion 3 by a depending bracket comprising two channel members 254 and 255 secured in clamping engagement around the spring by bolts 256.

The lever 252 has two rubber cushioning members 257 positioned within the lower part of the H section, each of said members fitting between the central hub 253 and the shackle for receiving pivot pins 202, and said members are shaped to engage against the upper leaves of leaf spring 209 and have openings therein for greater resiliency.

This form of my invention operates in general as does that shown in Figure 12. However, the rubber cushioning members 257 assist materially in absorbing and dampening out waves set up in leaf spring 209. Also, oscillatory movements of lever 252 are dampened out by the rubber members, which further act to automatically recenter the entire suspension. It will be noted that these rubber members are not subjected to load stresses in a balanced or centered position of the suspension, since the load is carried by the lever 252, short lever 203, links 207 and leaf spring 209. If for any reason the suspension gets off center it will be seen that channel 252 will be tilted away from the horizontal, so that one of the rubber members 257 will be compressed more than the other, which of course will at once bring the suspension back to centered position. Furthermore, this self-centering is present in the form shown in Figure 22 for the same reasons as given with respect to Figure 13, namely, that the load must be partially lifted when the suspension goes off center, so that it automatically returns to centered position. This feature has the advantageous lifting effect on the load when starting the vehicle, as described in connection with Figure 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. The combination with a multi-wheel vehicle having tandem axles, and hangers mounted for independent oscillation with respect to and on said axles, of a spring suspension comprising a resilient primary load supporting member connected between its ends to the vehicle frame and pivoted at its ends to the oscillatory hangers on the tandem axles at points offset from the axes of said axles, and means for transmitting oscillatory movements of the hanger on one axle to that of the other axle.

2. The combination with a multi-wheel vehicle having tandem axles, and hangers mounted for independent oscillation with respect to and on said axles, of a spring suspension comprising a resilient primary load supporting member pivoted to the vehicle frame between the tandem axles, said resilient member being pivoted to said oscillatory hangers at points offset vertically from the axes of the axles, and secondary load supporting means connecting said hangers together such that oscillation of one hanger is transmitted by said secondary load supporting means to oscillate the other hanger.

3. A shock dampening and compensating suspension for multi-wheel vehicles having tandem axles comprising a single trunnion on the vehicle frame between said tandem axles, independent oscillatory hangers on said tandem axles, resilient means pivoted on said trunnion and to said oscillatory hangers at points offset from the vertical planes of the axes of said axles whereby the vertical thrust of the load tends to oscillate said hangers individually relative to the axles, and means pivotally interconnecting said hangers to balance the load thrust and transmit oscillation of one hanger to the other hanger.

4. The combination with a multi-wheel vehicle having tandem axles, of a compensating suspension for reducing road shocks to the vehicle frame comprising a freely oscillatory hanger on each axle, a resilient primary load supporting member pivoted on a trunnion between the tandem axles and pivoted to said hangers at points inwardly offset from the vertical planes of the axes of the axles whereby load thrust on said resilient members tends to oscillate said hangers in reverse directions about their axles, and secondary load supporting means pivotally connecting the hangers together to prevent oscillation thereof due to load thrust, said last-named means transmitting oscillations of one hanger due to rise of its axle to the other hanger.

5. A road vehicle comprising a frame, tandem axles thereon, a trunnion on said frame, and a compensating suspension interposed between said trunnion and said axles including a primary supporting means mounted on said trunnion, means connecting said primary supporting means to each of said tandem axles at points offset from the vertical planes of the axes of said axles, and secondary supporting and compensating means connected to said axles and pivotally connected to said trunnion.

6. A road vehicle comprising a frame, tandem axles thereon, a trunnion on said frame between said axles, a hanger oscillatably supported on each axle and having a lever arm projecting away from the vertical planes of the axes of said axles, a resilient primary load supporting member pivoted on said trunnion and to the lever arms of said hangers, and a secondary load supporting and compensating means pivotally connected to said hangers.

7. A road vehicle, comprising a frame, tandem axles thereon, a single trunnion on said frame midway between said axles, and a compensating spring suspension interposed between said single trunnion and said tandem axles, comprising a primary load supporting means pivoted on said trunnion, a hanger flexibly mounted on each axle, said primary load supporting means being pivoted to each hanger at points offset from the vertical planes of the axes of the axles, and a secondary load supporting and compensating means pivotally connected between said hangers.

8. The combination with a multi-wheel vehicle having tandem axles, a single trunnion between said axles, and freely oscillatory hangers on said axles, of a spring suspension comprising a resilient primary load supporting member connected to the trunnion on the vehicle frame and to the hangers at points offset from the axes of the axles, and means connecting said hangers for transmitting oscillatory movements of one hanger to the other, said means being pivoted on the single trunnion supporting the primary load supporting means.

9. The invention as defined in claim 8 wherein the said means includes a rocker arm pivoted on said trunnion and connected by depending links to levers on said hangers.

10. The invention as defined in claim 8 wherein the suspension includes means for automatically re-centering itself under all conditions.

11. The invention as defined in claim 8 wherein resilient means are associated with the suspension for automatically re-centering the same.

12. The combination with a multi-wheel vehicle having tandem axles, and a single trunnion between said axles, of a compensating spring suspension comprising a resilient primary load supporting member pivoted on said trunnion, oscillatory hangers on each axle, said hangers having short inwardly projecting lever arms, the ends of said resilient member being pivoted on said lever arms, said hangers having other downwardly and inwardly projecting lever arms, and an equalizing member pivoted adjacent the mid-portion of said resilient primary member and connecting said last-named lever arms.

13. The combination with a multi-wheel vehicle having tandem axles, and a single trunnion between said axles, of a compensating spring suspension comprising a resilient primary load supporting member pivoted on said trunnion, oscillatory hangers mounted on and for oscillation relative to each axle, said hangers having short outwardly projecting lever arms, the ends of said resilient member being connected to said lever arms, said hangers having inwardly projecting lever arms, and means connecting said inwardly projecting lever arms for transmitting oscillatory movements of one hanger to the other.

14. The combination with a multi-wheel vehicle having tandem axles, and a single trunnion between said axles, of a compensating spring suspension comprising a resilient primary load-supporting member pivoted on said trunnion, oscillatory hangers on each axle, said hangers having inwardly projecting lever arms, means connecting said inwardly projecting lever arms for transmitting oscillatory movements of one hanger to the other, and resilient centering means positioned between the said means connecting the inwardly projecting lever arms and said resilient primary load-supporting member.

15. The invention as defined in claim 13 wherein resilient rubber members are positioned between and bear against the means connecting the inwardly projecting lever arms and the resilient primary load supporting member.

16. The invention as defined in claim 13 wherein a double acting shock absorber is connected to the vehicle frame and the pivoted suspension for preventing sudden shocks from oscillating said suspension about said trunnion.

17. The combination with a multi-wheel vehicle having tandem axles, a single trunnion between said axles, and oscillatory hangers on said axles, of a spring suspension pivoted on said trunnion and having a resilient primary load supporting member connected to the trunnion, short lever arms on the hangers projecting away from the vertical axes of the axles, said resilient member being connected to said lever arms, inwardly projecting lever arms on said hangers, having open-ended chambers in their inner ends, levers pivoted in said chambers, and projecting out of the open ends thereof, resilient means interposed between said last-named levers and the upper end and lower walls of said chambers, and means connecting the projecting ends of said last-named levers.

18. The combination with a multi-wheel vehicle having tandem axles, of a spring suspension comprising a primary load supporting member connected to the vehicle frame, oscillatory hangers on each axle, means for pivoting the ends of said primary load supporting member to said hangers at points offset from the vertical axes of said axles, and means interconnecting said hangers for transmitting oscillatory movements of one hanger to the other, said means including inwardly projecting levers having open-ended chambers, levers pivoted in said chambers with resilient means interposed between the walls of said chambers and said levers, and means connecting said levers.

19. The invention as defined in claim 18 wherein said resilient means comprises rubber cushioning members.

20. The invention as defined in claim 18 wherein a primary load supporting member comprises a bracket pivoted on said trunnion and having open-ended chambers, levers pivoted in said chamber and to said hangers, and resilient means interposed between the upper and lower walls of said chambers and said last-named levers.

21. The combination with a multi-wheel vehicle having tandem axles, oscillatory hangers on the axles, and a single trunnion on the vehicle frame, of a compensating spring suspension comprising a resilient primary load supporting member pivoted on said trunnion and pivoted to the oscillatory hangers at points offset from the vertical axes of said axles, and means for transmitting oscillatory movements of one hanger to the other comprising a bell crank lever pivoted at the intersection of its two arms to said trunnion, said bell crank having one arm secured on one hanger and its other arm connected by a tie rod to the other hanger.

22. The invention as defined in claim 21 wherein said tie rod is resiliently connected to the bell crank lever and to the hanger.

23. A road vehicle having a trunnion, a longitudinally spaced pivot on the vehicle, and a lever connecting said trunnion and said pivot, said lever being pivoted to said trunnion on said pivot, vertically spaced surfaces on said vehicle above and below said lever, and rubber cushioning members between said lever and said surfaces.

24. The invention as defined in claim 23 wherein said surfaces flare outwardly toward said trunnion and said rubber members are correspondingly flared.

25. The invention as defined in claim 23 wherein said lever is H shaped in cross section and said rubber members are positioned between the vertical walls of said H members.

26. In combination with the frame of a road vehicle, a trunnion designed to support said frame on a spring suspension; and resilient means, including rubber cushioning members, for yieldably mounting said trunnion for limited vertical movement upon the vehicle frame, said resilient means including a lever pivoted on said trunnion and to said frame at a point offset from the trunnion, with said rubber cushioning vertical movement of said lever.

27. In combination with the frame of a road vehicle, a trunnion, designed to support said frame on a spring suspension; and resilient means, including rubber cushioning members, for yieldably mounting said trunnion for limited vertical movement upon the vehicle frame, said resilient means including a longitudinal lever pivoted on said trunnion and to the vehicle frame at a point offset from the trunnion, with said rubber cushioning members interposed between said lever and vertically spaced stops on said vehicle frame.

28. In combination with the frame of a road vehicle, a trunnion, designed to support said frame on a spring suspension; and resilient means, including rubber cushioning members, for yieldably mounting said trunnion for limited vertical movement upon the vehicle frame, said resilient means including a lever reacting against said rubber members and connected to said trunnion by a joint allowing universal movement.

29. In combination with the frame of a road vehicle, a trunnion, designed to support said frame on a spring suspension; and resilient means, including rubber cushioning members for yieldably mounting said trunnion for limited vertical movement upon the vehicle frame, said mounting means embodying a lever pivoted to said trunnion on a ball hanger allowing universal movement of the lever, said lever extending between vertically spaced stationary surfaces on the vehicle frame, and said cushioning member being disposed between said lever and said surfaces.

In testimony whereof I affix my signature.

ALDEN G. RAYBURN.